US008151242B1

(12) United States Patent
Takayanagi et al.

(10) Patent No.: US 8,151,242 B1
(45) Date of Patent: Apr. 3, 2012

(54) DESCRIPTION SUPPORT APPARATUS AND METHOD FOR REQUISITION SHEET, AND RECORDING MEDIUM

(75) Inventors: Nobuo Takayanagi, Tokyo (JP);
Katsunobu Shibata, Tokyo (JP);
Masahiro Noguchi, Tokyo (JP);
Yoshitaka Ikeda, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 1826 days.

(21) Appl. No.: 09/543,359

(22) Filed: Apr. 5, 2000

(30) Foreign Application Priority Data

| Apr. 6, 1999 | (JP) | 11-99328 |
| Apr. 7, 1999 | (JP) | 11-99580 |
| Mar. 21, 2000 | (JP) | 2000-78548 |
| Mar. 21, 2000 | (JP) | 2000-78552 |

(51) Int. Cl.
*G06F 9/44* (2006.01)
*G06F 9/445* (2006.01)

(52) U.S. Cl. ........ 717/104; 717/105; 717/120; 717/141; 717/169

(58) Field of Classification Search .......... 717/169, 717/173, 100–123
See application file for complete search history.

(56) References Cited

U.S. PATENT DOCUMENTS

| 5,247,651 A | 9/1993 | Clarisse |
| 5,995,736 A * | 11/1999 | Aleksic et al. ............... 716/18 |
| 6,016,394 A * | 1/2000 | Walker ........................... 717/104 |
| 6,385,763 B1 * | 5/2002 | Meyer et al. ................... 717/100 |
| 6,618,852 B1 * | 9/2003 | van Eikeren et al. ......... 717/108 |
| 6,950,802 B1 * | 9/2005 | Barnes et al. .................... 705/7 |

FOREIGN PATENT DOCUMENTS

JP 04227538 A 8/1992

OTHER PUBLICATIONS

Tsumaki et al., "Evaluation Indexes and Software Design Method for Reusability and Extendibility", *Advantages of Object-Oriented Apprach*, pp. 112-115 (1998).

* cited by examiner

*Primary Examiner* — Chuck Kendall
(74) *Attorney, Agent, or Firm* — Connolly Bove Lodge & Hutz LLP

(57) ABSTRACT

With use of a relationship analyzing section for analyzing the relationship between constituent elements of a requisition sheet model described, for example, in the form of use case, and a relationship output section for outputting the analysis result to, for example, a display unit, an operator can check the presence/absence of an omission, contradiction, and the like in the displayed relationship between constituent elements, thereby easily checking whether the requisition sheet is accurately described. In addition, with use of a use case executing section for sequentially executing use cases included in a requisition sheet and a log recording section for recording a log by recording the process of executing each use case, the process of executing each use case included in the requisition sheet is recorded as a log, thereby allowing a scenario representing the operation of a system to be easily created by only sequentially executing use cases. The user can easily check the presence/absence of an omission of a use case or a description omission in a described requisition sheet by referring to the created scenario.

40 Claims, 25 Drawing Sheets

FIG. 4

| ACTOR / USE CASE | IN-SITU TRAINEE | IN-SITU MATERIAL MANAGER | PERSON IN CHARGE OF PLANNING | PLANNER | IN-SITU PERSON IN CHARGE OF TRAINING | INDIVIDUAL TRAINEE | IN-SITU PROGRESS MANAGER |
|---|---|---|---|---|---|---|---|
| PREPARATION | | | P | S | | | |
| DISCLOSURE OF EXERCISE | | P | | S | | | |
| PROVISION OF IMPLEMENTATION EXERCISE | | | | P | | | |
| IMPLEMENTATION OF EXERCISE | | | | P | | | |
| RESPONSE TO QUESTION | | | | | P | | |
| USE OF TRAINING ENVIRONMENT | P | | | | | P | |
| EXPLANATION OF TRAINING ENVIRONMENT | | | | | P | | |
| REVIEW | | | | P | | | |
| FOLLOW | S | | | | | S | P |

FIG. 5

| USE CASE \ USE CASE | PREPARATION | DISCLOSURE OF EXERCISE | PROVISION OF IMPLEMENTATION EXERCISE | IMPLEMENTATION OF EXERCISE | RESPONSE TO QUESTION | USE OF TRAINING ENVIRONMENT | EXPLANATION OF TRAINING ENVIRONMENT | REVIEW | FOLLOW |
|---|---|---|---|---|---|---|---|---|---|
| PREPARATION | | | | | | | U | | |
| DISCLOSURE OF EXERCISE | | | | U | | | | | |
| PROVISION OF IMPLEMENTATION EXERCISE | U | U | | U | | | | | |
| IMPLEMENTATION OF EXERCISE | | | | | U | U | | | U |
| RESPONSE TO QUESTION | | | | | | | | | |
| USE OF TRAINING ENVIRONMENT | | | | U | | | | | |
| EXPLANATION OF TRAINING ENVIRONMENT | | | | | | | | | |
| REVIEW | | | | | | | | | |
| FOLLOW | | | | | | | | | |

F I G. 12

USE CASE NAME [USE CASE 1]

BASIC SERIES

| NUMBER | EVENT | ACTOR | USE UC |
|---|---|---|---|
| 1 | IN-SITU TRAINEE OBTAINS EXERCISE | IN-SITU TRAINEE | |
| 2 | IN-SITU TRAINEE IMPLEMENTS ANSWER | IN-SITU TRAINEE | USE CASE 5 |
| 3 | IN-SITU TRAINEE SUBMITS ANSWER | IN-SITU TRAINEE | |
| 4 | | | |

[CREATE USE UC] ~74
[SPECIALIZE] ~75
[EXTEND] ~76

FIG. 13A

USE CASE ①

| NUMBER | EVENT |
|---|---|
| 1 | a |
| 2 | b |
| 3 | c |
| 4 | d |
| 5 | e |
| 6 | f |

FIG. 13B

USE CASE ② (SUB-USE CASE)

| NUMBER | EVENT |
|---|---|
| 1 | a |
| 2 | b |
| 3 | c |
| 4 | d |

FIG. 13C

USE CASE ①'

| NUMBER | EVENT | USE UC |
|---|---|---|
| 1 | X | UC ② |
| 2 | e | |
| 3 | f | |

FIG. 14A  FIG. 14B  FIG. 14C

USE CASE ①

| NUMBER | EVENT |
|---|---|
| 1 | a |
| 2 | b |
| 3 | c |
| 4 | d |
| 5 | e |

| NUMBER | EVENT |
|---|---|
| 1 | a |
| 2 | b |
| 3 | c |
| 4 | d |
| 5 | e |

USE CASE ②

| NUMBER | EVENT |
|---|---|
| 1 | a |
| 2 | b |
| 3 | x |
| 4 | d |
| 5 | e |

FIG. 15A  FIG. 15B

USE CASE ①

| NUMBER | EVENT |
|---|---|
| 1 | a |
| 2 | b |
| 3 | c |
| 4 | d |
| 5 | e |

USE CASE ②

BRANCH FROM EVENT c

| NUMBER | EVENT |
|---|---|
| 1 | x |
| 2 | y |
| 3 | z |

RETURN TO EVENT d

F I G. 20

ALTERNATIVE SERIES

| TARGET SERIES | EVENT | USE UC | POST-PROCESS |
|---|---|---|---|
| BASIC SERIES 3 | IF ACTOR CANNOT SOLVE QUESTION, HE/SHE ASKS QUESTION | | RETURN TO BASIC SERIES 3 |
| | | | |

F I G. 22

```
SCENARIO TRACE RESULT(UTILIZATION STATE OF USE CASE)

SCENARIO 001
UC001 「PROVISION OF EXERCISE」
UC005 「PREPARATION」
UC006 「DISCLOSURE OF EXERCISE」
UC012 「IMPLEMENTATION OF EXERCISE」
UC014 「ASKING QUESTION」
UC015 「REQUEST FOR HINT」
UC017 「SUBMISSION OF ANSWER」

SCENARIO 002
UC003 「PROVISION OF EXERCISE」
UC005 「PREPARATION」
UC006 「DISCLOSURE OF EXERCISE」
UC012 「IMPLEMENTATION OF EXERCISE」
UC017 「SUBMISSION OF ANSWER」

SCENARIO 003
```

DESCRIPTION SUPPORT APPARATUS AND METHOD FOR REQUISITION SHEET, AND RECORDING MEDIUM

BACKGROUND OF THE INVENTION

1. Field of the Invention

The present invention relates to description support apparatus and methods for requisition sheet, and recording media and, more particularly, to description support apparatus and methods for requisition sheet, and recording media which are suitably used for apparatus for supporting description of a requisition sheet used for system development such as software development.

2. Description of the Related Art

In general, in system development using a computer, a requisition sheet for a system is defined, and steps such as basic design and detail design are performed. The system is then coded. The resultant system is debugged, as needed. In this manner, the system is completed. Of these steps, the definition of the requisition sheet is especially important. If an ambiguous description or misleading description is made in a requisition sheet, the system designed and created on the basis of the contents of the requisition sheet becomes useless or cannot meet user's expectation.

If a requisition sheet is not properly described, a problem associated with the requisition sheet often arises in system development at the end of design or the beginning of coding. It is not easy to correct an error in this stage, resulting in an enormous development cost. In contrast to this, if a requisition sheet is properly described first, the occurrence of redoing operation can be minimized. It is therefore very important to describe a requisition sheet properly.

In many cases, however, requisition sheets cannot be correctly described in spite of the fact that requisition sheets are very important as described above.

Conventionally, in a preliminary stage for system development, operation performed by a person, the generation and flow of data, data output operation, and the like are described by using a human language and drawings in association with the contents of a current system and improved system or new system and the like, mainly the functions of the system. Recently, various methods have been used to describe requisition sheets. Of these methods, a method using a so-called use case for making a description in consideration of the use of a system instead of its function has been available.

Although various description methods for requisition sheets are available, omissions and errors in system design are manually checked from the described contents regardless of the type of method used. For example, a person sees a text or drawing itself described as a requisition sheet to make various checks on generation, use relationships, outputting, etc., of data, and also check who inputs what data and performs what operation.

Since these checks are manually performed, oversights and errors tend to occur. Although such checks can be made by using a computer or the like, it has not been clear how such checks are accurately and easily performed. If a check error or omission occurs, a correct requisition sheet cannot be described after all, resulting in redoing operation afterward. This greatly increases the development cost. In order to check description errors, omissions, and the like in a requisition sheet, it is important to check a system on the basis of the created requisition sheet. This is, however, very cumbersome and time-consuming operation.

SUMMARY OF THE INVENTION

The present invention has been made in consideration of the above situation, and aims to provide description support apparatus and methods for requisition sheet, which can support a description of an accurate requisition sheet by allowing accurate and easy checking of a described requisition sheet.

It is another object of the present invention to provide description support apparatus and methods for requisition sheet, which can support a description of an accurate requisition sheet by allowing easy creation of a scenario representing the operation of a system from a requisition sheet for the system which is described on the basis of a predetermined standard.

A description support apparatus for requisition sheet according to the present invention is characterized by comprising relationship analyzing means for analyzing a relationship between predetermined constituent elements constituting a described requisition sheet model, and relationship output means for outputting an analysis result obtained by the relationship analyzing means.

According to another aspect of the present invention, the apparatus is characterized by further comprising requisition sheet describing means for describing the requisition sheet according to a predetermined format so as to include constituent elements of the requisition sheet model.

In this case, the requisition sheet describing means describes the requisition sheet, for example, in the form of use case.

According to still another aspect of the present invention, the requisition sheet describing means includes views serving as information input windows for describing the requisition sheet in the form of use case and including a view for describing the use case on a text basis and a view for describing the use case on a diagram basis, and comprises information updating means for, when the requisition sheet is described by using one of the views, updating information to reflect the description contents in the remaining views.

In this case, the information updating means updates information in the remaining views on the basis of, for example, the analysis result obtained by the relationship analyzing means.

In addition, the relationship analyzing means comprises first analyzing means for analyzing a relationship between constituent elements included in a single unit requisition sheet, and second analyzing means for analyzing a relationship between constituent elements across unit requisition sheets by using an analysis result obtained for each unit requisition sheet by the first analyzing means.

According to still another aspect of the present invention, the apparatus further comprises designating means for designating constituent elements as targets whose relationship is to be analyzed, and the second analyzing means or both the first and second analyzing means analyze only a relationship between the designated constituent elements in accordance with designation made by the designating means.

The constituent elements of the requisition sheet model include at least an actor who performs an event in a system, data to be processed, and a condition in which the event is performed.

The relationship output means may display a result obtained by analyzing a relationship between two constituent elements in the form of a matrix or display a result obtained by analyzing a relationship between constituent elements as a use case diagram.

According to still another aspect of the present invention, the apparatus is characterized by further comprising structuralizing means for structuralizing the respective constituent elements of the requisition sheet model by using at least one of a use relationship in which a common constituent element that can be commonly used between constituent elements is used from a given constituent element, a generalization relationship in which a new constituent element is created by partly changing an original constituent element, and an extension relationship in which when a specific condition is satisfied in a given constituent element, another constituent element is processed.

For example, the requisition sheet is described in the form of use case, and a relationship between an event in the use case and another use case is structuralized according to the use relationship and the extension relationship.

A description support method for requisition sheet according to the present invention is characterized by comprising the requisition sheet describing step of describing a requisition sheet in accordance with a predetermined format which is set in advance such that constituent elements of a requisition sheet model are included, the relationship analyzing step of analyzing a relationship between constituent elements of the requisition sheet described according to the predetermined format, and the relationship output step of outputting the analysis result.

In this case, in the requisition sheet describing step, the requisition sheet may be described in the form of use case.

According to still another aspect of the present invention, the requisition sheet describing step allows views to be displayed as information input windows for describing the requisition sheet in the form of use case, which include a view for describing the use case on a text basis and a view for describing the use case on a diagram basis, and the method further comprises the information updating step of, when the requisition sheet is described by using one of the views, updating information to reflect the description contents in the remaining views.

In this case, the information in the remaining views is updated in the information updating step on the basis of, for example, the analysis result obtained in the relationship analyzing step.

In addition, the relationship analyzing step may comprise the first analyzing step of analyzing a relationship between constituent elements included in a single unit requisition sheet, and the second analyzing step of further analyzing a relationship between constituent elements across unit requisition sheets by using an analysis result obtained for each unit requisition sheet in the first analyzing step.

The relationship analyzing step may comprise the first analyzing step of analyzing a relationship between constituent elements included in a single unit requisition sheet, the designating step of designating constituent elements, of constituent elements of the requisition sheet model, as targets whose relationship is to be analyzed, and the second analyzing step of further analyzing a relationship between the constituent elements, designated in the designating step, across unit requisition sheets by using an analysis result obtained for each unit requisition sheet in the first analyzing step.

In the relationship output step, a result obtained by analyzing a relationship between two constituent elements may be displayed in the form of a matrix, or a result obtained by analyzing a relationship between constituent elements may be displayed as a use case diagram.

According to still another aspect of the present invention, the method is characterized by further comprising the structuralizing step of structuralizing the respective constituent elements of the requisition sheet model by using at least one of a use relationship in which a common constituent element that can be commonly used between constituent elements is used from a given constituent element, a generalization relationship in which a new constituent element is created by partly changing an original constituent element, and an extension relationship in which when a specific condition is satisfied in a given constituent element, another constituent element is processed.

For example, the requisition sheet is described in the form of use case, and a relationship between an event in the use case and another use case is structuralized according to the use relationship and the extension relationship.

A computer-readable recording medium according to the present invention is characterized by a program recorded thereon for causing a computer to function as requisition sheet describing means for describing a requisition sheet in accordance with a predetermined format which is set in advance such that constituent elements of a requisition sheet model are included, relationship analyzing means for analyzing a relationship between constituent elements of a requisition sheet described according to a predetermined standard, and relationship output means for outputting an analysis result obtained by the relationship analyzing means.

According to still another aspect of the present invention, a computer-readable recording medium is characterized by a program recorded thereon for causing a computer to function as requisition sheet describing means, having views serving as information input windows having a predetermined format set in advance to include constituent elements of a requisition sheet model and including a view for describing a requisition sheet on a text basis and a view for describing the requisition sheet on a diagram basis, for describing the requisition sheet in accordance with one of the views, relationship analyzing means for analyzing a relationship between constituent elements of the requisition sheet described by the requisition sheet describing means, and information updating means for, when the requisition sheet is described by using one of the views, updating information to reflect description contents of the requisition sheet in the remaining views on the basis of an analysis result obtained by the relationship analyzing means.

According to still another aspect of the present invention, the medium is characterized by a program recorded thereon for causing the computer further to function as structuralizing means for structuralizing the respective constituent elements of the requisition sheet model by using at least one of a use relationship in which a common constituent element that can be commonly used between constituent elements is used from a given constituent element, a generalization relationship in which a new constituent element is created by partly changing an original constituent element, and an extension relationship in which when a specific condition is satisfied in a given constituent element, another constituent element is processed.

A description support apparatus for requisition sheet according to still another aspect of the present invention is characterized by comprising use case executing means for sequentially executing use cases included in a requisition sheet described in the form of use case according to a predetermined standard on the basis of the requisition sheet, and log recording means for recording a log by recording the process of executing each of the use cases by the use case executing means.

According to still another aspect of the present invention, the apparatus may further comprise branch selecting means for making a user select a use case to be executed next at a branch appearing in the process of the preceding use case, and the use case executing means may sequentially execute the use cases by interactive processing with the user.

The use case executing means may sequentially execute the use cases included in the requisition sheet by automatically selecting a use case to be executed next at a branch appearing in the process of the preceding use case.

The apparatus may further comprise condition setting means for providing the use case executing means with a condition in which each use case included in the requisition sheet is executed, and the use case executing means may sequentially execute the use cases by automatically selecting a use case to be executed next at a branch appearing in the process of the preceding use case within the range of a provided condition.

The use case executing means may sequentially execute the use cases included in the requisition sheet by automatically and sequentially selecting all branch destinations that can be taken as use cases to be executed next at a branch appearing in the processing of executing the use case.

According to still another aspect of the present invention, the apparatus further comprises requisition sheet describing means for describing the requisition sheet in accordance with the predetermined standard which is set such that a use case of a basic series representing a basic flow and a use case of an alternative series representing an exceptional flow can be described while being linked to each other.

According to still another aspect of the present invention, the apparatus further comprises structuralizing means for structuralizing the respective constituent elements of the requisition sheet, described in the form of use case, by using at least one of a use relationship in which a given constituent element uses another constituent element, a generalization relationship in which a new constituent element is created by partly changing an original constituent element, and an extension relationship in which when a specific condition is satisfied in a given constituent element, another constituent element is processed.

In this case, a relationship between an event in the use case and another use case may be structuralized according to the use relationship and the extension relationship.

The use case executing means may sequentially execute each use case by branching from an event in a given use case to another use case in accordance with the use, generalization, and extension relationships structuralized by the structuralizing means.

The apparatus may have a first mode of sequentially executing each use case by branching from a given use case to another use case in accordance with links established between use cases of a basic series and use cases of an alternative series, and a second mode of sequentially executing each use case by branching from an event in the given use case to another use case in accordance with the use, generalization, and extension relationships between use cases which are structuralized by the structuralizing means.

According to still another aspect of the present invention, the apparatus further comprises requisition sheet describing means for describing the process time for each use case in describing the requisition sheet, and total time computing means for computing the total process time taken for a series of processes indicated by a log recorded by the log recording means on the basis of the process time for each use case which is described by the requisition sheet describing means.

According to still another aspect of the present invention, the apparatus further comprises importance degree/use frequency setting means for setting at least one of an importance degree and a use frequency with respect to the log recorded by the log recording means, and log analyzing means for analyzing the log in which at least one of the importance degree and the use frequency is set, and obtaining at least one of the importance degree and use frequency of each use case included in the log.

A description support method for requisition sheet according to still another aspect of the present invention is characterized in that use cases included in a requisition sheet described in the form of use case according to a predetermined standard are sequentially executed on the basis of the requisition sheet, and the process of execution is recorded.

According to still another aspect of the present invention, the respective constituent elements of the requisition sheet described in the form of use case are structuralized by using at least one of a use relationship in which a given constituent element uses another constituent element, a generalization relationship in which a new constituent element is created by partly changing an original constituent element, and an extension relationship in which when a specific condition is satisfied in a given constituent element, another constituent element is processed.

According to still another aspect of the present invention, the process time for each use case is described in describing the requisition sheet, and the total process time taken for a series of processes indicated by the log, in which the process of executing each of the use cases is recorded, is computed, on the basis of the described process time for each use case.

According to still another aspect of the present invention, at least one of an importance degree and a use frequency is set with respect to the log in which the process of executing each of the use cases is recorded, the log in which at least one of the importance degree and the use frequency is set is analyzed, and at least one of the importance degree and the use frequency of each use case included in the log is obtained.

A computer-readable recording medium according to the present invention is characterized by a program recorded thereon for causing a computer to function as use case executing means for sequentially executing use cases included in a requisition sheet described in the form of use case according to a predetermined standard on the basis of the requisition sheet, and log recording means for recording a log by recording the process of executing each of the use cases by the use case executing means.

According to still another aspect of the present invention, the recording medium is characterized by a program recorded thereon for causing the computer further to function as structuralizing means for structuralizing the respective constituent elements of the requisition sheet model by using at least one of a use relationship in which a given constituent element uses another constituent element, a generalization relationship in which a new constituent element is created by partly changing an original constituent element, and an extension relationship in which when a specific condition is satisfied in a given constituent element, another constituent element is processed.

According to still another aspect of the present invention, the recording medium is characterized by a program recorded thereon for causing the computer further to function as requisition sheet describing means for describing the process time for each use case in describing the requisition sheet, and total time computing means for computing the total process time taken for a series of processes indicated by a log recorded by the log recording means on the basis of the process time for each use case which is described by the requisition sheet describing means.

According to still another aspect of the present invention, the recording medium is characterized by a program recorded thereon for causing the computer further to function as importance degree/use frequency setting means for setting at least one of an importance degree and a use frequency with respect to the log recorded by the log recording means, and log analyzing means for analyzing the log in which at least one of the importance degree and the use frequency is set, and obtaining at least one of the importance degree and use frequency of each use case included in the log.

Since the present invention is made up of the above technical means, the relationships between the respective constituent elements of a requisition sheet model are analyzed and output. By referring to the output relationships between the constituent elements, the operator can check whether a relationship to be defined is omitted or any unnecessary relationship is defined. This makes it possible to check whether the requisition sheet is properly described.

According to another characteristic feature of the present invention, the operator can describe a requisition sheet by using that view, of views prepared as information input windows for describing a requisition sheet, which allows the operator easily to write information. When the definition contents of the requisition sheet are changed by using one view, the definition contents of the remaining views are updated accordingly.

According to another characteristic feature of the present invention, when a common constituent element is created by using, for example, a use relationship, the common constituent element can be used from constituent elements. This facilitates reuse of constituent elements. Assume that another constituent element is created by using a generalization relationship. In this case, when a requisition sheet is described with regard to various constituent elements, common portions between the constituent elements need not be repeatedly input. At this time, since a generalized constituent element has only the difference with respect to the original constituent element as data, the corrected contents of the original constituent element can be reflected in the generalized constituent element without performing any special process. When another constituent element is created by using an extension relationship, a conditional branch is allowed from a given constituent element to another constituent element.

According to another characteristic feature of the present invention, in the process of sequentially executing the use cases included in a requisition sheet described according to a predetermined standard, the executed use cases are sequentially recorded as a log. As a result, a scenario is created, which represents the flow of execution of use cases, i.e., the operation of the system. The predetermined standard in this case is, for example, a standard determined to include link information between use cases in the description of a requisition sheet. The execution of each use case indicates the operation of loading a use case at a link destination and displaying it. The user refers to the scenario created in this manner to check, for example, whether a use case that should be present is omitted or any unexecuted use case is present. This makes it possible to check whether a requisition sheet is properly described.

According to still another characteristic feature of the present invention, use cases are sequentially executed, while each use case at a link destination is read out from an event in a given use case, in accordance with structuralized use, generalization, and extension relationships. The process of execution is recorded as a log. As a result, a scenario is created, which represents not only the flow of use cases but also the flow of events included in the respective use cases. This makes it possible to comprehend the flow of processing based on each use case in detail.

According to still another characteristic feature of the present invention, the total process time required to execute a series of processes according to the created scenario is computed by using the scenario. By calculating the total process time required to execute a created scenario, one index can be obtained, which is used to analyze current business operation and determine the adequacy, feasibility, and the like of a requisition for systematization.

According to still another characteristic feature of the present invention, when an importance degree, use frequency, or the like is set for a created scenario instead of each use case, the importance degree, the use frequency, or the like of each use case can be obtained from the set contents. This makes it easy to set an importance degree, a use frequency, or the like. In addition, this setting operation is easy for the user to comprehend.

In brief, according to the present invention, the relationship between constituent elements of a requisition sheet model described in the form of use case is analyzed, and the analysis result is output to, for example, a display unit. By referring to the displayed relationship between constituent elements, therefore, the operator can easily check the presence/absence of any omission, contradiction, and the like in the described requisition sheet. This makes it possible to accurately describe a requisition sheet required for the development of a system by feeding back the check result to the description of the requisition sheet as needed. This can therefore prevent the inconvenience of causing redoing operation in the design or implementation stage afterward, and hence can greatly reduce the cost for the development of a system as compared with the prior art.

According to still another characteristic feature of the present invention, views are prepared, which serve as information input windows for describing the requisition sheet in the form of use case and include a view for describing the use case on a text basis and a view for describing the use case on a diagram basis. When a requisition sheet is described by using one of the views, the description contents are also reflected in the remaining views. This allows the operator to define a requisition sheet by using one of the views which is easy for the operator to write. Therefore, the operator can selectively use views depending on a portion which can be easily defined on a diagram basis and a portion which is easily defined on a text basis, thus providing the operator with an environment of good operability.

According to still another characteristic feature of the present invention, the respective constituent elements of a requisition sheet model can be structuralized by using at least one of a use relationship in which a given constituent element uses another constituent element, a generalization relationship in which a new constituent element is created by partly changing an original constituent element, and an extension relationship in which when a specific condition is satisfied in a given constituent element, another constituent element is processed. If, for example, a common constituent element is created by using a use relationship, the reuse of constituent elements can be facilitated.

In addition, when another constituent element is created by using a generalization relationship, the common portion between various constituent elements need not be repeatedly input. This reduces the operation load on the operator. In this case, since a specialized constituent element has only differences with respect to the original constituent element as data, the contents of corrections made in the original constituent element can be reflected in the specialized constituent element without performing any specific processing, thus always maintaining consistency. This makes it possible to reduce omissions of corrections input errors and described a more accurate requisition sheet.

Furthermore, by creating another constituent element using an extension relationship, a conditional branch is allowed from a given constituent element to another constituent element.

If a structuralized requisition sheet can be described not only on a text basis but also on a diagram basis, the operator can easily comprehend structuralized relationships at a glance by using a diagram-based view. In contrast to this, a text-based view can be used to describe detailed contents. That is, the operator can define structuralized constituent elements by selectively using views depending on a portion which can be easily defined on a diagram basis and a portion which is easily defined on a text basis.

According to still another characteristic feature of the present invention, on the basis of a requisition sheet described in the form of use case according to a predetermined standard, the use cases included in the requisition sheet are sequentially executed, and the process of execution is recorded. A scenario representing the operation of the system can be easily created by only sequentially executing the use cases. By referring to the created scenario, the operator can check the presence/absence of omissions of use cases and descriptions and the like.

This makes it possible to easily check whether a requisition sheet is properly described. By feeding back the check result on the requisition sheet as needed, the requisition sheet required for the development of a system can be accurately described. This can therefore prevent the inconvenience of causing redoing operation in the design or implementation stage afterward, and hence can greatly reduce the cost for the development of a system as compared with the prior art.

According to still another characteristic feature of the present invention, each constituent element of a requisition sheet described in the form of use case is structuralized by using at one of use, generalization, and extension relationships. Therefore, while each use case at a link destination is sequentially read out from a corresponding event in a given use case in accordance with the use, generalization, and extension relationships between structuralized use cases, this process is recorded as a log. As a result, a detailed scenario can be created, which represents not only the flow of use cases but also the flow of events included in the respective use cases. This allows the operator to comprehend the flow of processing in detail and accurately describe a requisition sheet by checking in detail whether the requisition sheet is properly described, e.g., by checking whether the description of any use case is omitted or any unexecuted use case is present in the requisition sheet required for the development of a system. This makes it possible to describe a requisition sheet accurately.

According to still another characteristic feature of the present invention, in describing a requisition sheet, the process time for each use case is described, and the total process time taken for a series of processes is computed with respect to a scenario recorded as a log as the use cases are executed. Therefore, one index for determining whether the scenario is good or bad can be obtained. On the basis of this index, the necessity for correcting a requisition sheet can be determined, and the requisition sheet can be re-described into a more proper requisition sheet, as needed.

According to still another characteristic feature of the present invention, at least one of an importance degree and use frequency is set with respect to a created log, and the log in which the importance degree or use frequency is set is analyzed, thus obtaining the importance degree or use frequency of each use case included in the log. This makes it easy to set an importance degree, use frequency, or the like, and also makes it easy for the user to comprehend and perform these settings, as compared with a case wherein an importance degree, use frequency, or the like is set for each use case individually.

BRIEF DESCRIPTION OF THE DRAWINGS

FIG. 4 is a view showing an example of matrix display of analysis results;

FIG. 5 is a view showing an example of matrix display of analysis results;

FIG. 12 is a view showing an example of a use case input window according to the third embodiment;

FIGS. 13A, 13B, and 13C are views for explaining operation to be performed in creating a common sub-use case;

FIGS. 14A, 14B, and 14C are views for explaining operation to be performed in creating a specialized use case;

FIGS. 15A and 15B are views for explaining operation to be performed in creating an extended use case;

FIG. 20 is a view showing an alternative series input window;

FIG. 22 is a view showing examples of scenarios created in the fourth embodiment;

DETAILED DESCRIPTION OF THE PREFERRED EMBODIMENTS

An embodiment of the present invention will be described below with reference to drawings.

First Embodiment

Figure 1:
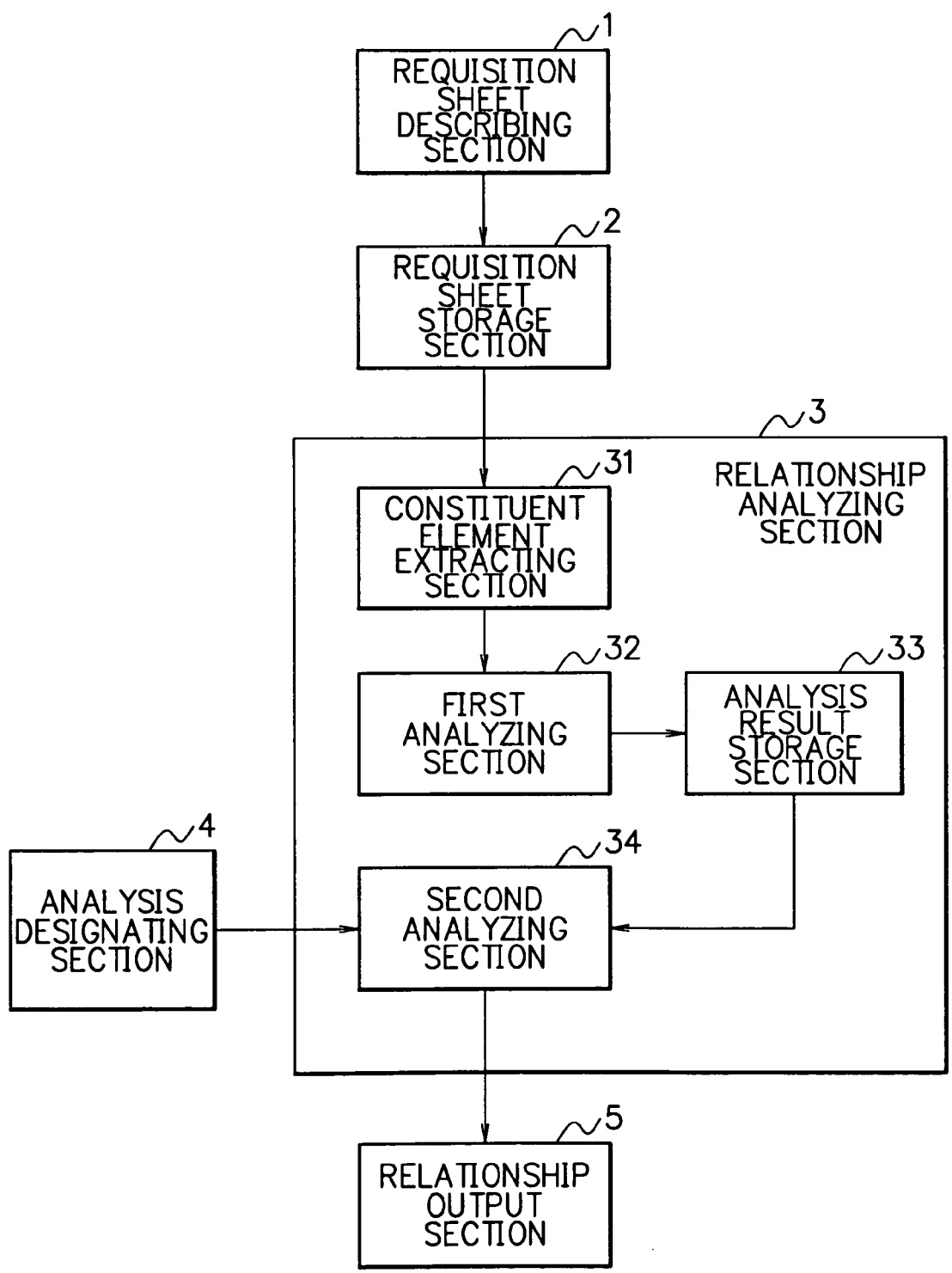
FIG. 1 is a block diagram showing the elementary characteristics of a description support apparatus for requisition sheet according to the first embodiment of the present invention.

FIG. 1 is a block diagram showing the elementary characteristics of a description support apparatus for requisition sheet according to the first embodiment of the present invention.

Referring to FIG. 1, a requisition sheet describing section 1 describes the definitions of a requisition sheet in accordance with a predetermined format so as to cover all the constituent elements of a requisition sheet model according to this embodiment. More specifically, as an input format for a requisition sheet, an input window including all the constituent elements of the above requisition sheet model is prepared. A requisition sheet is then described by inputting various pieces of information in this window. In this embodiment, the constituent elements of the requisition sheet model include five elements, namely a use case, actor, data, condition, and business rule.

In the use case, in consideration of the manner in which a system to be developed is used in business operation, a sequence of actions (events) and the like that are performed by an operator during the operation of a system are described in a natural language to clarify each constituent element in each transaction. The actor indicates a specific person who will actually perform each action. The data indicates specific data to be input/output in each action. The condition indicates a state or the like to be satisfied in each action. The business rule indicates a rule that should be observed in executing business operation by using the developed system.

Figure 2:
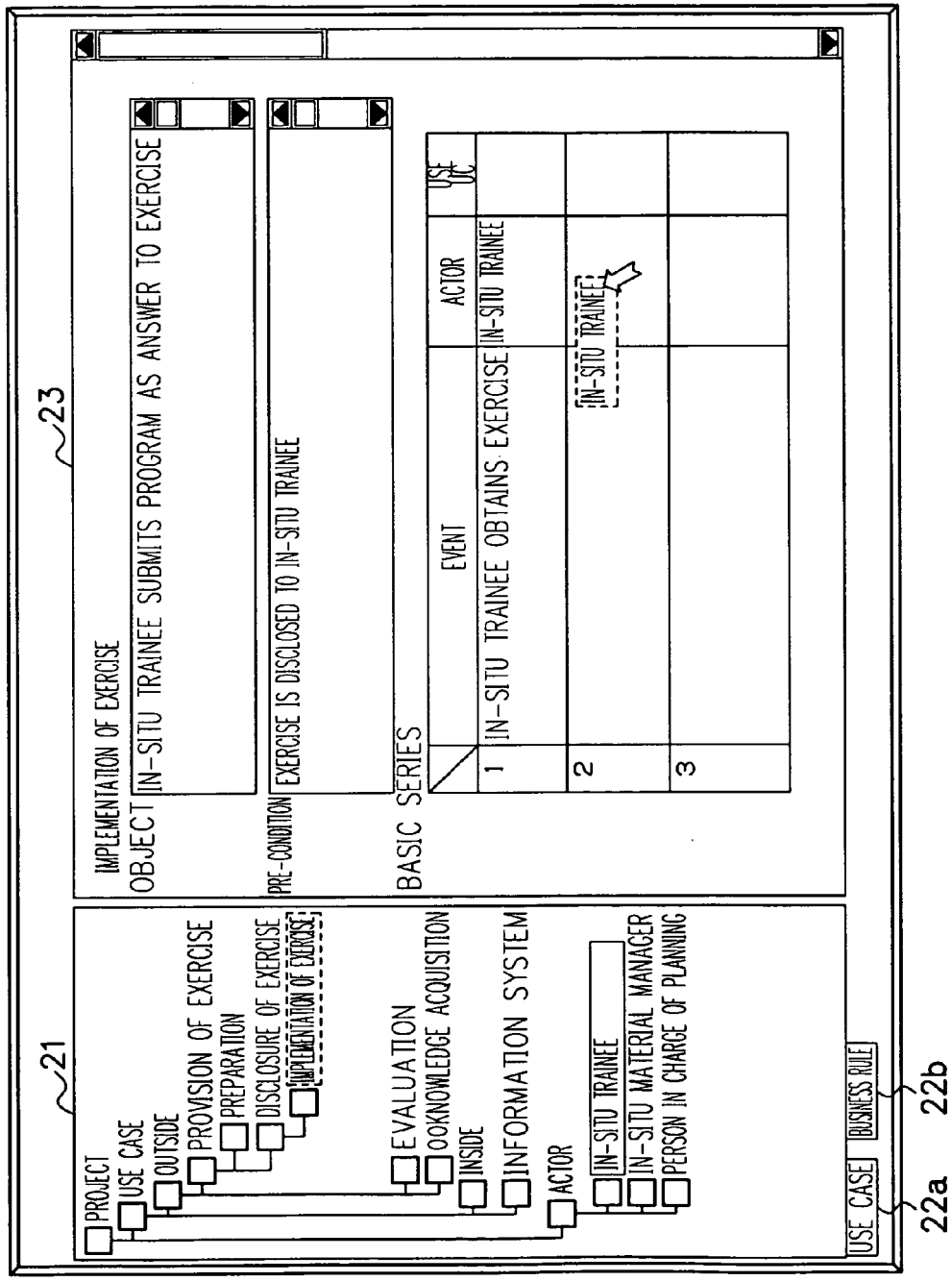
FIG. 2 is a view showing an example of a requisition sheet input window according to the first embodiment.

FIG. 2 is a view showing an example of an input window for a requisition sheet according to this embodiment. Referring to FIG. 2, a tree structure display window 21 is for displaying a requisition sheet model that defines a development project for a given system in the form of a tree structure. Tags 22a and 22b are provided below the window 21. When one tag 22a is clicked, a use case input window is displayed, as shown in FIG. 2. When the other tag 22b is clicked, a business rule input window (not shown) is displayed.

FIG. 2 shows an example of information to be defined as a requisition sheet for a project to develop an education system for programming. A list of use relationships of use cases and actors in the project is displayed in the tree structure display window 21. According to this tree structure, "use case" and "actor" are subordinate to "project", and "outside", "inside", and "information system" are subordinate to "use case".

In this case, the use relationship between the use cases in use case "outside" is shown, in particular. More specifically, use cases termed "provision of exercise", "evaluation", and "○○ knowledge acquisition" are subordinate to the level of use case "outside", and use cases termed "preparation" and "disclosure of exercise" are subordinate to "provision of exercise". In addition, a use case termed "implementation of exercise" is subordinate to "disclosure of exercise".

As described above, a requisition sheet associated with a project to produce a given business operation system is comprised of unit requisition sheets describing individual business operations as units to be performed in the system, and each of use cases such as "provision of exercise", "evaluation", "○○ knowledge acquisition", "preparation", "disclosure of exercise", and "implementation of exercise" displayed in the tree structure display window 21 corresponds to a corresponding one of the unit requisition sheets.

When, for example, an operator clicks an arbitrary use case portion in the tree structure display window 21 with a mouse, an input window 23 for the use case is displayed on the right side of the tree structure display window 21. FIG. 2 shows a case wherein the operator clicks a use case portion corresponding to "implementation of exercise". In this use case input window 23, an input window for an object, pre-condition, basic series, post-condition, and data is displayed after the display of the use case name.

In the "object" column in the above use case input window 23, the rough contents of business operation to be executed in the use case are defined. In the "pre-condition" column, a condition that must be satisfied before the execution of the business operation is defined. In the "basic series" column, detailed contents indicating, for example, who performs what in the use case are defined. In this case, events indicating the detailed operation contents, actors indicating specific persons who execute the events, and other use cases to be used in the execution of the events are sequentially described for the respective operations. FIG. 2 shows a state wherein the operator drags "in-situ trainee" from the tree structure display window 21 and drops it in the "actor" column.

In the "post-condition" column, a specific condition to be set after the execution of the operation defined in the use case is defined. For example, the operator defines conditions after the operation in both a case wherein the operation ends in success and a case wherein the operation ends in failure. In the "data" column, specific data to be input/output in the use case is defined. Although the input windows for the post-condition and data are not shown, the operator can see them by scrolling down on the screen.

As described above, in this embodiment, since a requisition sheet is described by inputting various pieces of information in a natural language that allows everyone to have the same understanding, unlike drawings and the like, the correspondence between the function of a system to be developed and business operation to be executed by using it can be clarified. This makes it possible to minimize misunderstanding. In this case, since the operator is allowed to describe information about predetermined input items, he/she can easily describe use cases and the like and can easily input information. As shown in FIG. 2, since a constituent element can be described by drag and drop, input errors can be prevented.

The requisition sheet describing section 1 in FIG. 1 sequentially inputs use cases including various pieces of information such as objects, conditions, basic series, and data in units of units requisition sheets on the basis of the format input window shown in FIG. 2, and also sequentially inputs corresponding business rules in units of unit requisition sheets. A requisition sheet storage section 2 stores each requisition sheet information input in this manner. In this case, requisition sheet information is stored in units of defined use cases and business rules.

A relationship analyzing section 3 analyzes the relationship between the respective constituent elements in a requisition sheet described according to the format determined in the above manner. The relationship analyzing section 3 includes a constituent element extracting section 31, first analyzing section 32, analysis result storage section 33, and second analyzing section 34. The constituent element extracting section 31 extracts portions corresponding to the constituent elements (use case, actor, data, condition, and business rule) of a requisition sheet model, in units of unit requisition sheets, from the requisition sheet information stored in the requisition sheet storage section 2.

The first analyzing section 32 analyzes the relationship between the respective constituent elements included in a single unit requisition sheet by using each constituent element information extracted by the constituent element extracting section 31, and stores the result in the analysis result storage section 33 in accordance with each unit requisition sheet. In this case, pairs of constituent elements, i.e., identical constituent elements or different constituent elements, are selected from the five constituent elements constituting a requisition sheet model, and the relationship between each pair of constituent elements is analyzed.

More specifically, the relationship between two of the five constituent elements, e.g., the relationship between the use case and the actor (e.g., who executes the use case) or the relationship between the use case and the data (e.g., what data is input/output in the use case), is analyzed in this case. In addition, the relationship between identical constituent elements, e.g., the relationship between a use case and another use case (e.g., which another use case is used in a given use case), is analyzed. The types of relationships to be analyzed include a use relationship and an extension relationship.

The second analyzing section 34 further analyzes the relationships between constituent elements over unit requisition sheets included in one project by using the analysis results obtained by the first analyzing section 32 for the respective unit requisition sheets and stored in the analysis result storage section 33. Like the first analyzing section 32 described above, the second analyzing section 34 selects pairs of identical or different constituent elements from the five constituent elements, and analyzes the relationship between each pair of constituent elements.

Note that the operator uses the analysis designating section 4 to designate specific constituent elements, of the five constituent elements, as targets whose relationship is to be analyzed. More specifically, the second analyzing section 34 analyzes the relationships between the designated constituent elements throughout the entire requisition sheet model by using the analysis results obtained in units of unit requisition sheets and stored in the analysis result storage section 33. The relationship output section 5 displays the analysis results obtained by the second analyzing section 34 on the screen by, for example, outputting the results to the display unit.

Figure 3:
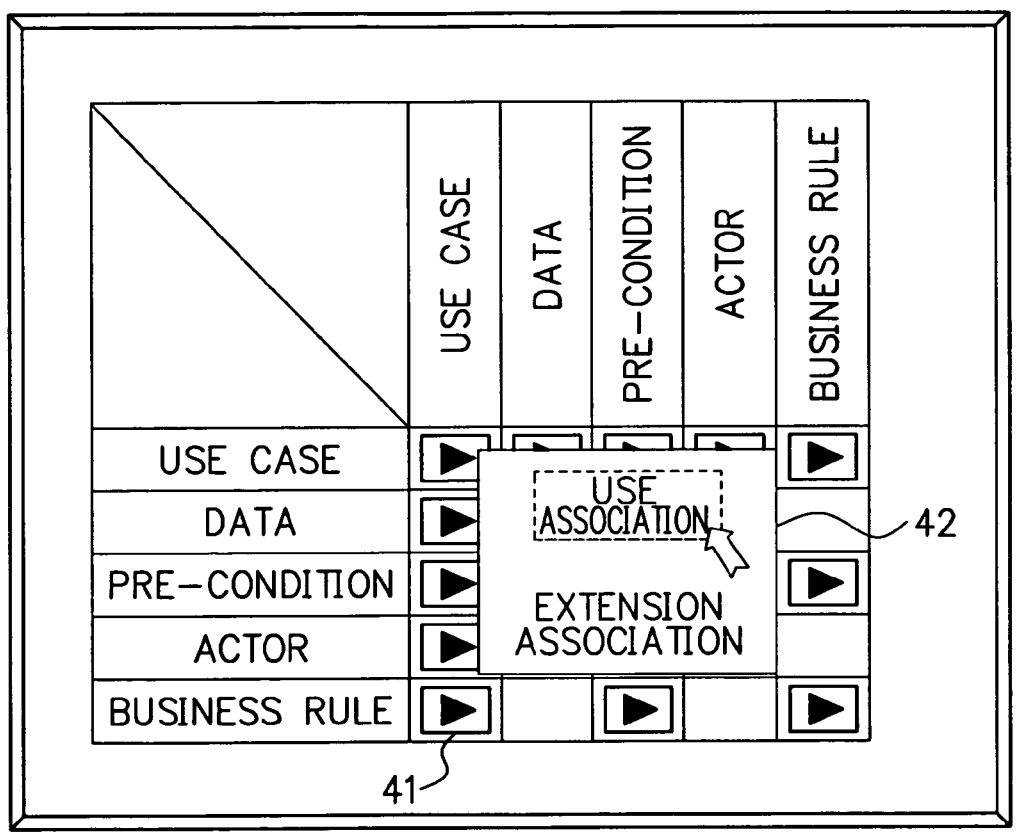
FIG. 3 is a view showing an example of a window for designating constituent elements whose relationship is to be analyzed.

FIG. 3 is a view showing an example of a window for designating constituent elements whose relationship is to be analyzed by the analysis designating section 4. As shown in FIG. 3, this embodiment uses a matrix display having the five constituent elements arranged along each of the ordinate and abscissa, and has an analysis designation button 41 provided in each box on the matrix. These analysis designation buttons 41 are not provided in all the boxes but are displayed in only boxes corresponding to constituent elements that can be related to each other. For example, the use case and business rule can be related to each other, but the data and business rule cannot be related.

When the operator clicks any analysis designation button 41, a relationship type selection window 42 for selecting either a use relationship or an extension relationship, like the one shown in FIG. 3, pops up. When the operator selects the use relationship or extension relationship, the second analyzing section 34 analyzes the relationships between the constituent elements designated by the second analyzing section 34 throughout the entire requisition sheet model. The analysis results are then displayed on the screen by the relationship output section 5. In this embodiment, the analysis results on the relationships between the designated constituent elements are displayed in the form of a matrix.

Figure 6:
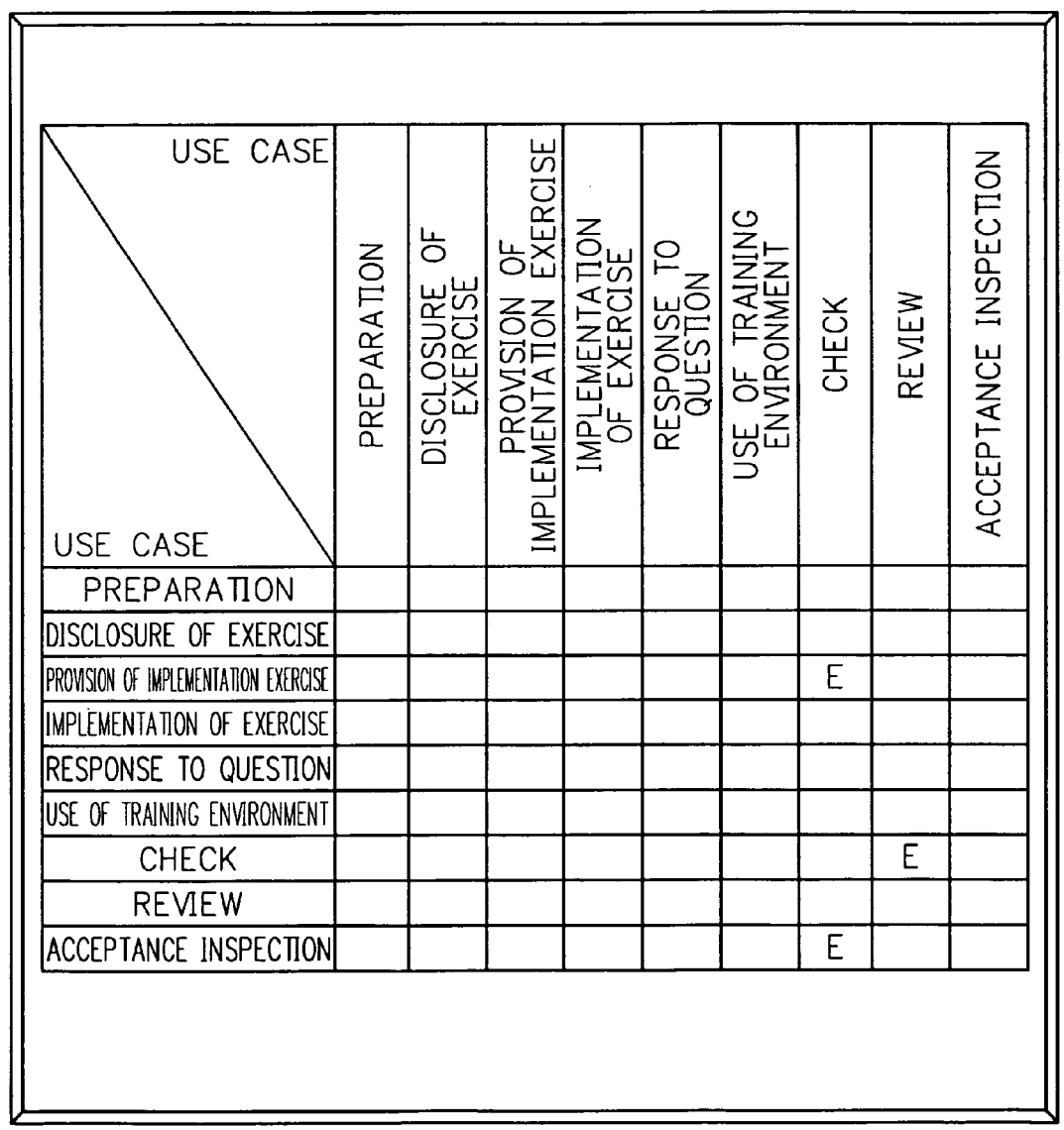
FIG. 6 is a view showing an example of matrix display of analysis results.

FIGS. 4 to 6 are views showing examples of matrix display of the analysis results. FIG. 4 is a view showing the relationship between actors and use cases. In the matrix display shown in FIG. 4, "P" indicates a main actor (primary actor) for a corresponding use case; and "S", a subordinate actor (secondary actor). The actor input in the first column of the basic series in the use case input window shown in FIG. 2 becomes a primary actor. All the actors input in the second and subsequent columns of the basic series become secondary actors.

The operator can know specific actors associated with the respective use cases at a glance by referring to the relationship between the actors and the use cases.

FIGS. 5 and 6 are views showing the relationship between use cases. Referring to FIG. 5, "U" indicates the use relationships between the use cases. By referring to this relationship, for example, the operator can know at a glance that the use case "preparation" uses the use case "explanation of training environment". Referring to FIG. 6, "E" indicates the extension relationship between the use cases. For example, the operator can know that a use case termed "provision of implementation exercise" is an extension of a use case termed as "check", and a use case termed "acceptance inspection" is another use case that is an extension of the use case "check".

By referring to the relationships between the use cases, the operator can know at a glance which use cases are used or extended in units of use cases.

Although not shown, the relationships between the remaining constituent elements of the requisition sheet model can also be displayed in the form of a matrix in the same manner as described above.

By seeing these matrix displays, the operator can easily check whether there is an omission of any relationship that should be defined or any unnecessary relationship is defined. This makes it possible to easily check whether the requisition sheet is properly described. If the operator knows by this check that the requisition sheet is not properly described, he/she can correctly re-describe the requisition sheet, thus preventing redoing operation at the end of the design of a system or the like.

Figure 7:
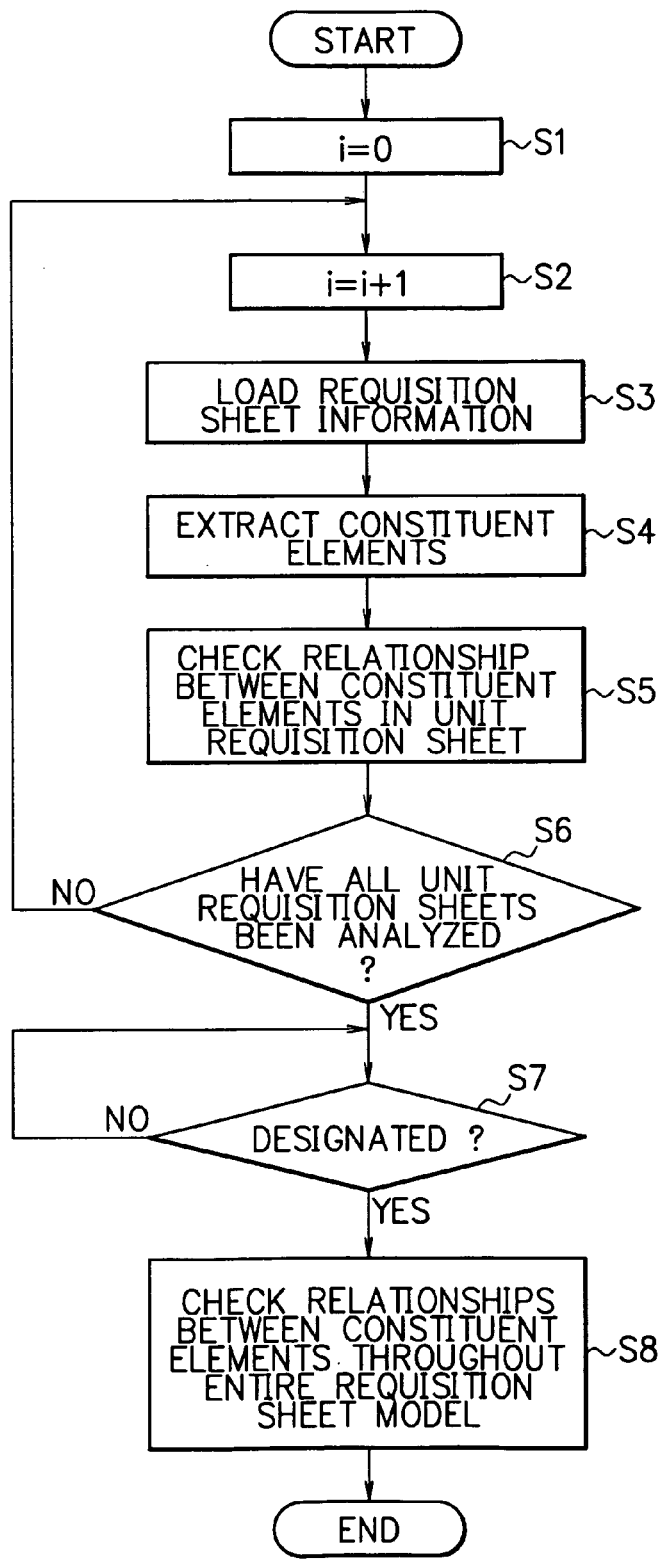
FIG. 7 is a flow chart showing the operation performed by a relationship analyzing section in FIG. 1.

FIG. 7 is a flow chart showing the operation of the relationship analyzing section 3 in FIG. 1. Referring to FIG. 3, in step S1, a count value i for counting unit requisition sheets (use cases at each level) defined in accordance with the input window in FIG. 2 is initialized to "0". In step S2, the count value i is incremented by one. The flow then advances to step S3. In step S3, the constituent element extracting section 31 in the relationship analyzing section 3 loads requisition sheet information described about a given one unit requisition sheet from the requisition sheet storage section 2.

In step S4, the five constituent elements of a requisition sheet model are discriminated and extracted from the loaded requisition sheet information. In this case, the information on each constituent element can be easily extracted by loading the information on a portion displayed as a constituent element input column in the use case input window 23 in FIG. 2. For example, each extracted piece of information is information indicating a specific actor in the "basic series" column, a specific use case that is used, the presence/absence of a precondition, or data to be input/output in the use case. Alternatively, each constituent element may be discriminated and extracted by reading and analyzing information input outside the constituent element input column.

In step S5, the first analyzing section 32 sequentially analyzes the relationship between each pair of identical or different constituent elements of the five constituent elements extracted from one unit requisition sheet in step S2. More specifically, like in generating a class diagram of an object model, related constituent elements are sequentially linked to each other so as to check the relationships between the constituent elements in one unit requisition sheet. The analysis results are stored in the analysis result storage section 33.

The flow then advances to step S6 to check whether relationship analysis processing is completed for all the unit requisition sheets defined for a given one project. If NO in step S6, the flow returns to step S2 to execute relationship analysis for the remaining unit requisition sheet. If the relationships between the constituent elements in all the defined unit requisition sheets are analyzed, the flow advances to step S7 to check whether constituent elements to be subjected to relationship analysis are designated by the analysis designating section 4. If YES in step S7, the flow advances to step S8. The second analyzing section 34 then analyzes the relationship between the designated constituent elements throughout the entire requisition sheet model. The analysis result is output to the relationship output section 5, and the processing is terminated.

As described in detail above, according to the description support apparatus for requisition sheet of this embodiment, the relationships between the constituent elements of a requisition sheet model described according to a predetermined format are analyzed, and the analysis results are displayed on, for example, a display unit. Whether the requisition sheet is accurately described can be easily checked by checking omissions, contradictions, and the like in the displayed relationships between the constituent elements. Assume that an inadequacy is found in a requisition sheet. In this case, the final requisition sheet necessary for the development of a system can be accurately re-described to correct the inadequacy without any contradiction and omission. This makes it possible to minimize the occurrence of the inconvenience of redoing operation in the subsequent design state or implementation stage.

In addition, since a requisition sheet is described in a natural language in accordance with the form of each use case, the load on the operator who describes the requisition sheet can be reduced, and anyone can easily understand the created requisition sheet afterward. Note that since the relationships between constituent elements can be easily comprehended, this apparatus can be effectively used for, for example, the analysis of an existing process.

In the above embodiment, the first analyzing section 32 automatically performs relationship analysis processing in units of unit requisition sheets, but the second analyzing section 34 performs relationship analysis processing throughout an entire requisition sheet model only when the analysis designating section 4 performs designation. In contrast to this, all the analysis results obtained when the first and second analyzing sections 32 and 34 perform relationship analysis processing may be stored in advance. When the operator designates constituent elements afterward, the relationship between the designated constituent elements can be selected and output. Alternatively, both the first and second analyzing sections 32 and 34 may perform analysis processing only when the operator designates constituent elements, and may analyze and output the relationship of the designated constituent elements.

In the above embodiments, five constituent elements, namely a use case, actor, data, condition, and business rule are presented as the constituent elements of a requisition sheet model. However, they are merely examples, and the present invention is not limited to them. The method of analyzing the relationships between the respective constituent elements is not limited to the above method of analyzing relationships within unit requisition sheets first, and then analyzing relationships as a whole, as in the above case with the first and second analyzing sections 32 and 34.

Figure 8:
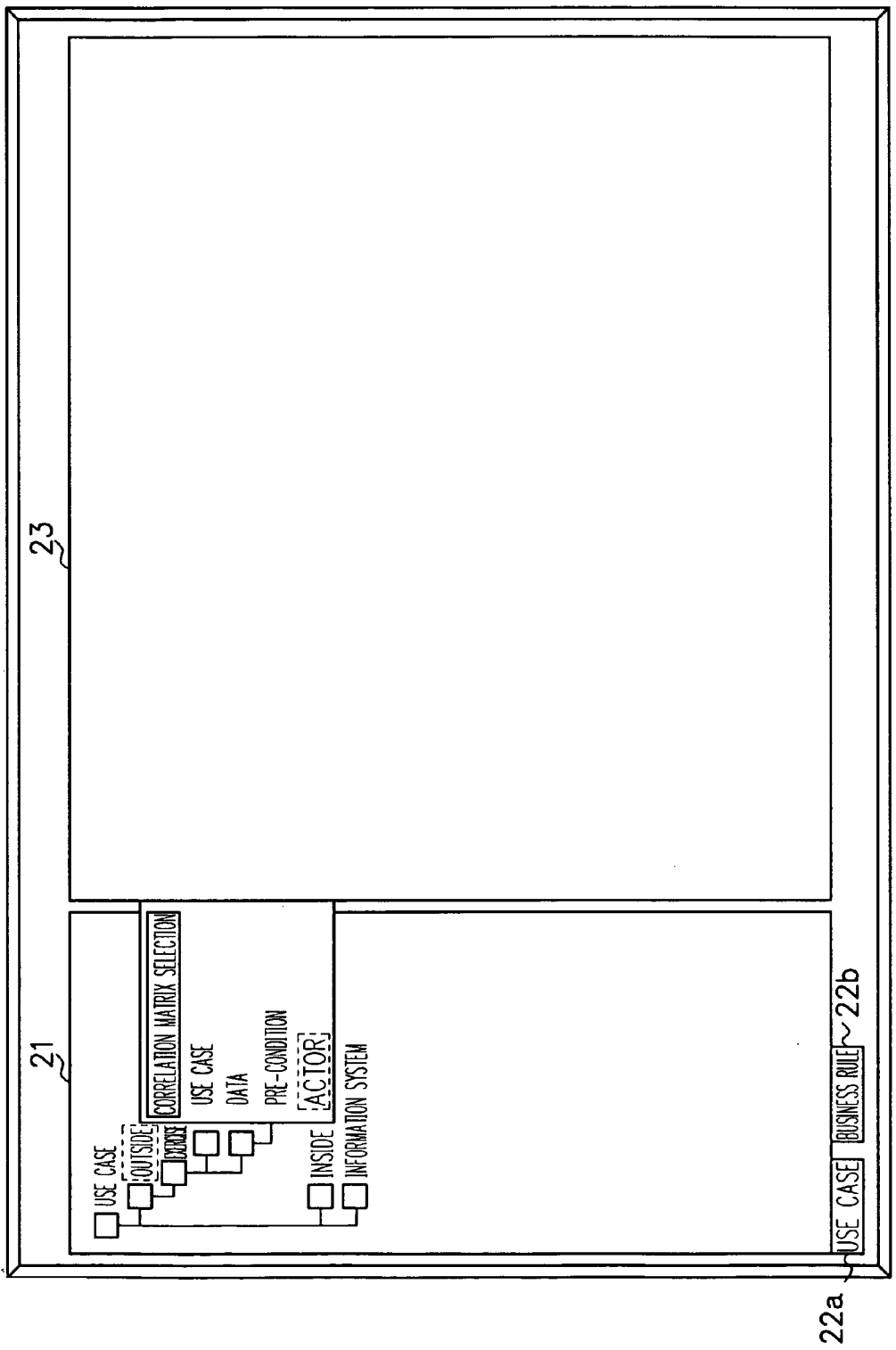
FIG. 8 is a view showing another example of the window for designating constituent elements whose relationship is to be analyzed.

In the above embodiment, a designation window like the one shown in FIG. 3 is used to designate desired constituent elements subjected to relationship analysis by the analysis designating section 4. However, such constituent elements can be designated through the tree structure display window 21 shown on the left side in FIG. 2. FIG. 8 shows a state wherein the operator moved the mouse cursor to the icon "outside", pressed, for example, the right button of the mouse, and selected icon "actor" after moving the cursor thereto. In this case, a correspondence matrix of use cases and actors, like the one shown in FIG. 4, is displayed.

In the above embodiment, the analysis results on the relationships between constituent elements are displayed in the form of a matrix, as shown in FIGS. 4 to 6. However, when the operator clicks a desired box on this matrix, an input window corresponding to the box may be displayed. When the operator sees the matrix display and determines that there is some contradiction or omission of a definition, he/she returns to the requisition sheet input window and describes a definition again. In this case, with the above operation, the operator can quickly jump to the corresponding input window, and hence operability and efficiency can be improved.

Figure 9:
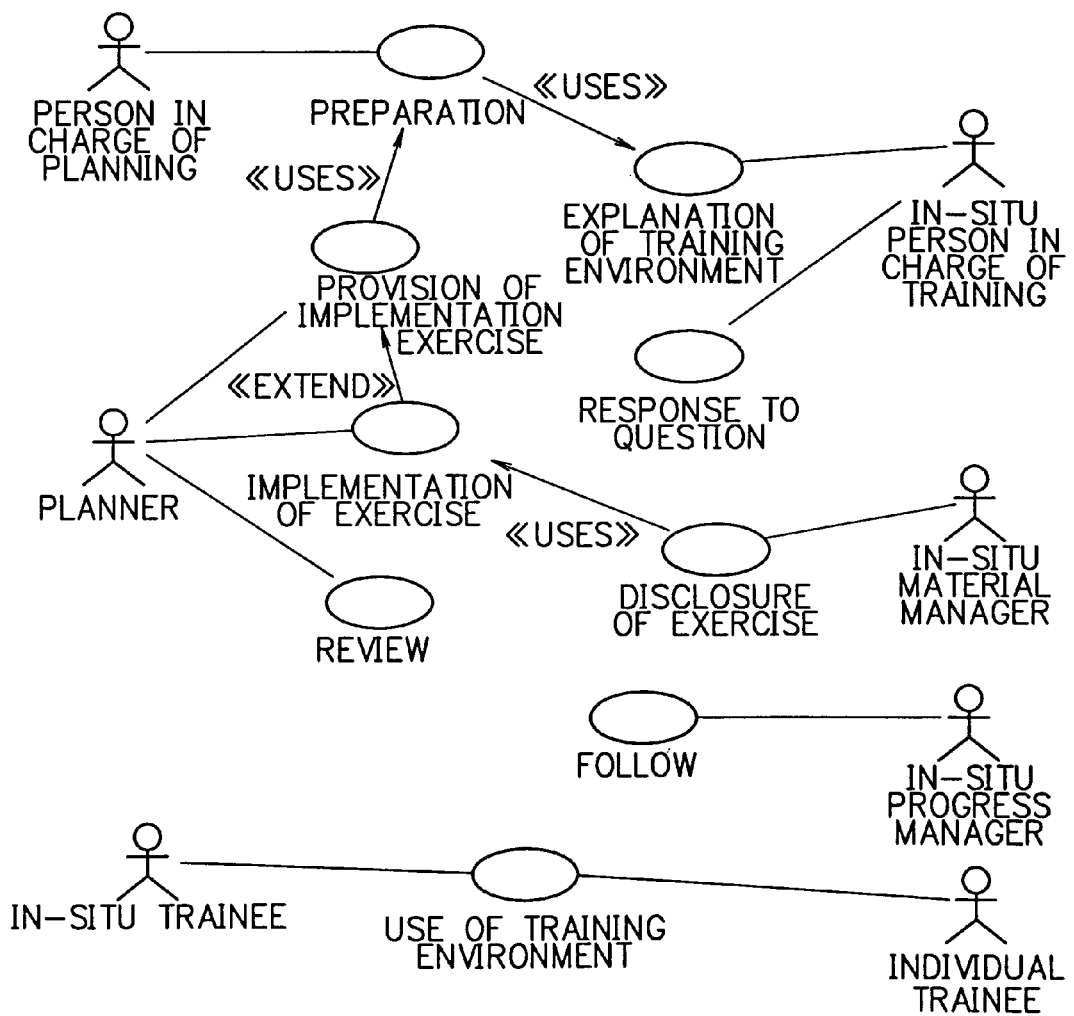
FIG. 9 is a view showing an example of a use case diagram displayed to indicate the relationships between constituent elements.

In the above embodiment, the results obtained by analyzing the relationships between the respective constituent elements are displayed in the form of a matrix. However, they may be displayed as a use case diagram. FIG. 9 shows an example of the use case diagram to be displayed. Referring to FIG. 9, each elliptic portion represents a use case of a unit requisition sheet, and each human figure represents an actor. In this use case diagram, both a use relationship and an extension relationship are displayed. With this diagram, the operator can check the relationships between the respective constituent elements as images.

In the above embodiment, the operator determines the presence/absence of a contradiction or omission in a requisition sheet by himself/herself by seeing a matrix display indicating the relationships between constituent elements. If, however, rules that should be observed are registered in advance, the apparatus can be made to automatically determine the presence/absence of a contradiction or omission. Assume that neither a primary actor nor a secondary actor is present, data is redundantly used twice or more, or there is no correspondence between a data reference location and a data input location. In such a case, the apparatus can automatically check items that can be generally checked, and output an error message upon detecting a violation of a rule.

Second Embodiment

The second embodiment of the present invention will be described next.

Figure 10:
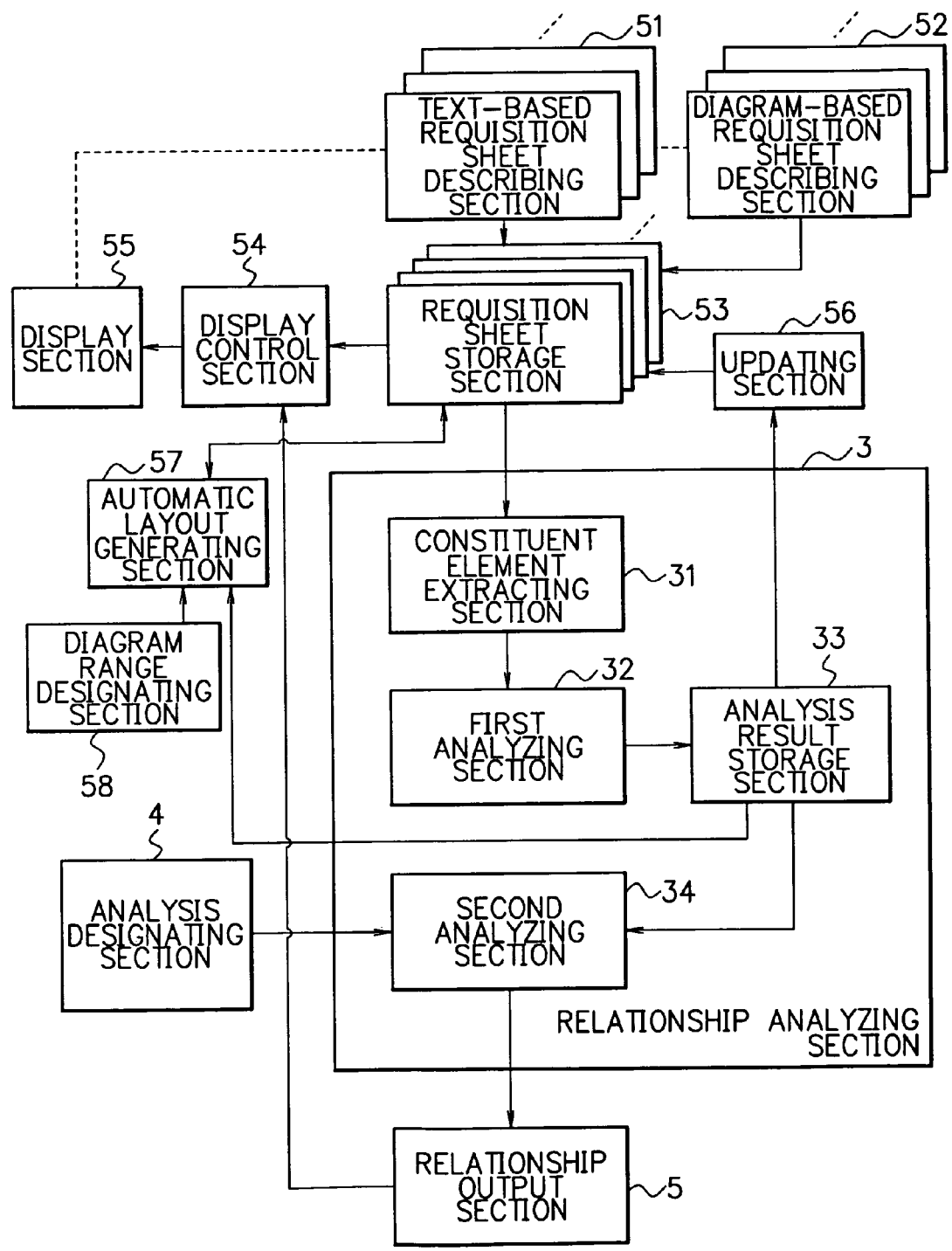
FIG. 10 is a block diagram showing the elementary characteristics of a description support apparatus for requisition sheet according to the second embodiment of the present invention.

FIG. 10 is a block diagram showing elementary characteristics of a description support apparatus for requisition sheet according to the second embodiment of the present invention. The same reference numerals as in FIG. 1 denote parts having the same functions in FIG. 10, and a detailed description thereof will be omitted.

Referring to FIG. 10, a text-based requisition sheet describing section 51 describes the definitions of a requisition sheet on a text basis in accordance with a predetermined format so as to cover all the constituent elements (the use case, actor, data, condition, and business rule) of a requisition sheet model. The section is almost identical to the requisition sheet describing section 1 in FIG. 1. However, the text-based requisition sheet describing section 51 differs from the requisition sheet describing section 1 in FIG. 1 in that it has views as input windows for describing a requisition sheet. Note that the input windows are displayed on a display section 55 such as a CRT or LCD.

Examples of the views of the text-based requisition sheet describing section 51 described above are a window for allowing an operator easily to describe only the essential items of a requisition sheet, a window for describing a requisition sheet as a list in tabular form, and a window for describing a requisition sheet in detail by filling in predetermined input items one by one.

In addition to the text-based requisition sheet describing section 51 for describing a requisition sheet on a text basis, this embodiment includes a diagram-based requisition sheet describing section 52 capable of describing a requisition sheet on a diagram base. The diagram-based requisition sheet describing section 52 also has views as input windows for describing a requisition sheet. The views of the text-based requisition sheet describing section 51 and diagram-based requisition sheet describing section 52 can be simultaneously displayed on the display section 55 under the control of a display control section 54.

Information on a requisition sheet described by the text-based requisition sheet describing section 51 and on a requisition sheet described by the diagram-based requisition sheet describing section 52 is stored in a requisition sheet storage section 53. In this case, the pieces of defined requisition sheet information are stored in accordance with the respective views of the requisition sheet describing sections 51 and 52.

The display control section 54 controls the display section 55 selectively to display the one, which corresponds to a designated view, of the pieces of information corresponding to the respective views and stored in the requisition sheet storage section 53. In displaying the requisition sheet defined by the diagram-based requisition sheet describing section 52 on the display section 55, the display control section 54 displays actors and use cases by using predetermined icons expressed by using a GUI (Graphical User Interface) or the like. Pieces of information on the display positions of icons and the like are stored in the requisition sheet storage section 53. The display control section 54 also controls the display section 55 to display related information output from a relationship output section 5.

An updating section 56 updates the requisition sheet information stored in the requisition sheet storage section 53 such that definition contents obtained as a result of addition, deletion, or updating by using a given one of the views of the text-based requisition sheet describing section 51 and diagram-based requisition sheet describing section 52 are reflected in the remaining views.

More specifically, when addition, deletion, or updating is performed with respect to the definitions of a requisition sheet by using a given view, the requisition sheet information stored in the requisition sheet storage section 53 is changed in accordance with the view. A relationship analyzing section 3 analyzes the changed requisition sheet information and stores the relationship information between the respective constituent elements in an analysis result storage section 33. The updating section 56 updates the requisition sheet information corresponding to the views other than the view that is actually used for updating or the like of the requisition sheet on the basis of the relationship information stored in the analysis result storage section 33 at this time, thereby making requisition sheet contents corresponding to all the views identical.

Assume the requisition sheet information corresponding to each view and stored in the requisition sheet storage section 53 is to be updated in this manner. In this case, if information corresponding to a diagram-based view is to be updated, an automatic layout generating section 57 also updates pieces of information about the display positions of icons and the like, which are stored in the requisition sheet storage section 53, to automatically adjust the window layout so as to prevent the icons from overlapping.

In this case, the updating section 56 updates the requisition sheet information corresponding to the views other than the view in which the requisition sheet is actually changed. However, further to simplify the processing, the requisition sheet information corresponding to all the views including the view in which the requisition sheet is actually changes may be updated. In this case, even if the requisition sheet corresponding to the view in which the actual change or the like is made is updated, no significant problem arises because the requisition sheet is overwritten with the same contents.

When the requisition sheet information corresponding to each view, which is stored in the requisition sheet storage section 53, is updated in this manner, the display control section 54 displays the requisition sheet information in accordance with the new updated contents. With this operation, when the contents of a requisition sheet are changed on one of views displayed on the display section 55, the contents of the requisition sheet in the remaining views displayed on the display section 55 are changed in accordance with the change.

Figure 11:
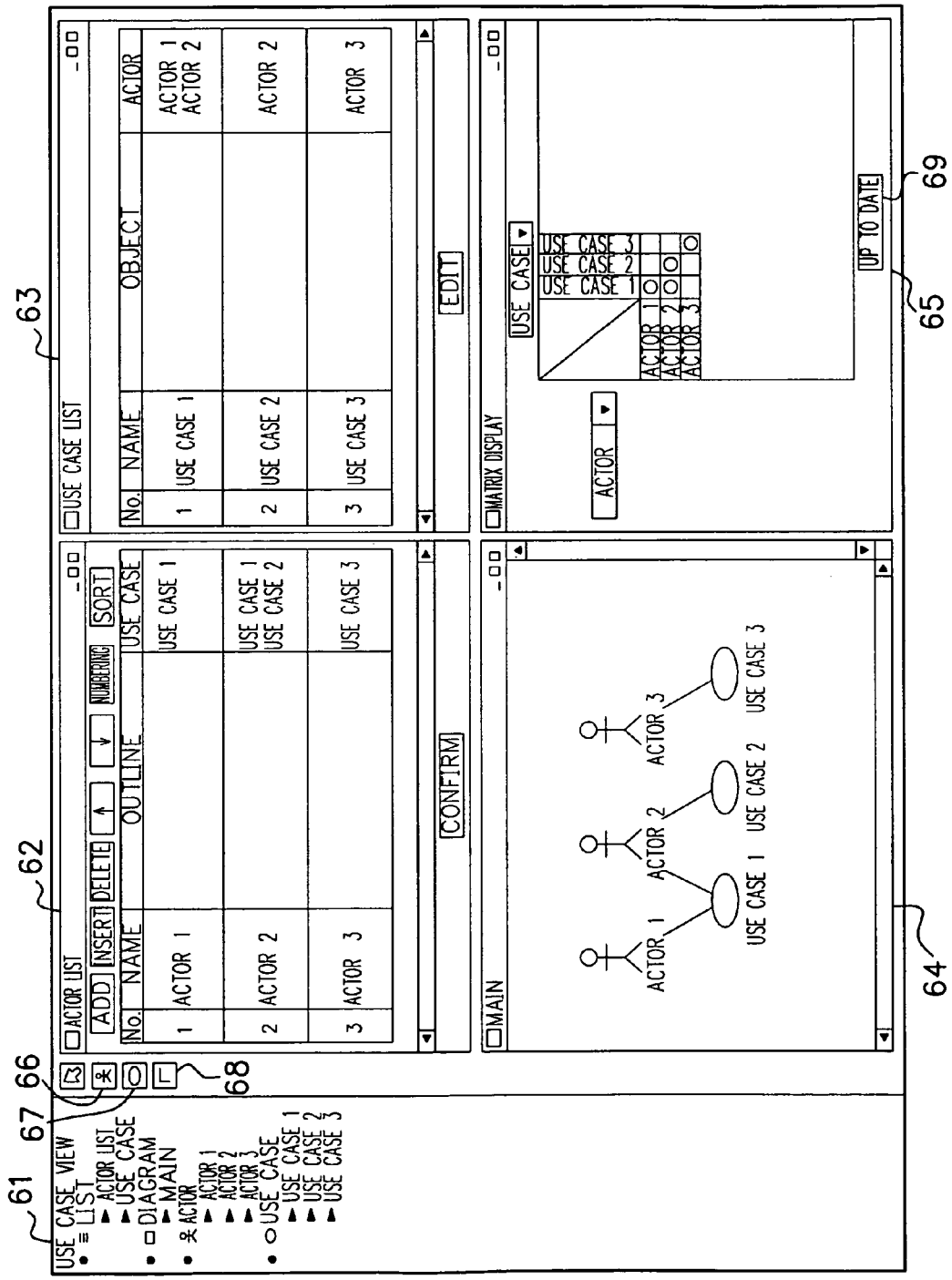
FIG. 11 is a view showing an example of a display screen having views according to the second embodiment.

FIG. 11 is a view showing an example of the display window on the display section 55 according to this embodiment. Referring to FIG. 11, a tree structure display window 61 is a window for displaying a requisition sheet model that defines a project to develop a given system, like the tree structure display window 21 in FIG. 2. In this tree structure display window 61, for example, the operator can arbitrarily add, delete, or change actors and use cases.

In the case shown in FIG. 11, three views 62 to 64 are displayed as input windows (views) for describing a requisition sheet. A matrix display view 65 is also displayed as a window for displaying the relationships between the constituent elements analyzed on the basis of the described requisition sheet.

The first view for describing a requisition sheet is the actor list window 62 for displaying a list of actors in tabular form. The second view is the use case list window 63 for displaying a list of use cases in tabular form. These windows 62 and 63 are input windows for describing a requisition sheet by using text-based the requisition sheet describing section 51. The third view is the diagram window 64 for displaying actors and use cases in diagrammatic form such as a GUI. This view is an input window for describing a requisition sheet by using the diagram-based requisition sheet describing section 52.

In the columns of the first actor list window 62, the operator defines the names of actors, outlines indicating the contents of the respective actors, and use cases (executed by the actors) related to the respective actors. In the columns of the second use case list window 63, the operator defines the names of use cases, objects indicating the rough contents of business operations executed in the respective use cases, and actors (who execute the use cases) related to the respective use cases.

In the third diagram screen 64, the operator defines the same contents as those defined on a text basis in the actor list window 62 or use case list window 63 (excluding the outlines of the actors and the objects of the use cases) on a diagram basis. In the case shown in FIG. 11, each actor is expressed by a human figure icon, and each use case is expressed by an elliptic icon. In addition, the relationships between the actors and the use cases are expressed by lines drawn between them.

In defining a requisition sheet in this diagram window 64, the operator can add a new actor by clicking an actor button 66, and can add a new use case by clicking a use case button 67. In addition, the operator can add a relationship between an actor and a use case by clicking a communication button 68.

In the window shown in FIG. 11, when, for example, the operator clicks a portion corresponding to a desired use case with the mouse, a detailed use case input window like the one shown in FIG. 2 is displayed to allow the operator to define the use case in more detail.

Although FIG. 11 shows a state wherein requisition sheet definition information has already been input, all views are blank at first.

Assume that actors 1 and 2 and use cases 1 and 2 have already been defined, and actor 3 and use case 3 are to be added by using the actor list window 62. This operation will be described below.

First of all, actor 3 is added in the "actor name" column in the actor list window 62. At this point of time, although the description contents of a requisition sheet corresponding to the remaining views including the input windows 63 and 64 are not updated, the use case list window 63 is set to allow the operator to select actor 3 newly defined in the actor list window 62 as an actor who executes some use case.

The operator then adds use case 3 in the "use case" column in the use case list window 63. At this point of time as well, the description contents of the requisition sheet corresponding to the remaining views including the input windows 62 and 64 are not updated, but the actor list window 62 is set to allow the operator to select use case 3 newly defined in the use case list window 63 as a use case that some actor is to execute.

Subsequently, the operator adds actor 3 in the "actor" column in the use case list window 63 as an actor who executes use case 3. As a result, the relationship analyzing section 3 analyzes the relationship between actor 3 and use case 3. The updating section 56 updates the definition contents corresponding to the remaining views on the basis of the analyzed relationship information.

With this operation, the definition contents in the remaining input windows 62 and 64, which are displayed simultaneously with the use case list window 63, are updated to be equivalent to the definition contents obtained by addition in the use case list window 63. More specifically, use case 3 is additionally displayed in the "use case" column in the actor list window 62. In addition, the icon of actor 3 and the icon of use case 3 are additionally displayed in the diagram window 64 while a line is drawn between the icons.

In this case, when the description of a requisition sheet is changed in a given text-based view, the descriptions of the requisition sheet corresponding to the remaining text-based views and diagram-based views are updated. In contrast to this, when the description of a requisition sheet is changed in a given diagram-based view is changed, the descriptions of the requisition sheet corresponding to the remaining diagram-based views and text-based views are updated.

In this case, when the description of a requisition sheet is changed in a given text-based view, the display of the requisition sheet corresponding to a diagram-based view is automatically updated. However, the updated contents may be displayed in accordance with an instruction from the operator. A diagram range designating section 58 shown in FIG. 10 is an arrangement for executing this instruction.

More specifically, when actor 3 and use case 3 are added in the use case list window 63, the display in the actor list window 62 is updated accordingly in the same manner as described above. In this case, however, the added contents of actor 3 and use case 3 are not displayed in the diagram window 64 yet. The icon of actor 3 and the icon of use case 3 are additionally displayed with a line being drawn between them only after the operator designates the range of actor 3 and use case 3 in the actor list window 62 by using the diagram range designating section 58 and gives an instruction to diagrammatize it.

In other words, when an actor or use case is deleted or some portion displayed in the diagram is updated, the deleted contents or updated contents may be immediately reflected in the diagram-based view. With regard to a newly added portion, however, it is often uncertain whether the added portion should be additionally displayed in the diagram-based view. For this reason, such a portion is not automatically added but is added until designation is made by the diagram range designating section 58. This is because a given use case diagram may display only part of a requisition sheet instead of the whole. Therefore, in a view designated to display all elements, contents added in another view can be automatically reflected without posing any problem.

In the above operation, when actor 3 is added in the "actor name" column in the actor list window 62 for the first time, the description contents in the remaining views are not updated. Even at this point of time, however, the relationship with actor 3 may be immediately analyzed by the relationship analyzing section 3, and the analysis result may be reflected in the remaining views.

In this case, when the relationship with actor 3 is analyzed, the analysis result indicates that there is no use case related to actor 3. The updating section 56 updates the description contents corresponding to the remaining views on the basis of this analysis result. More specifically, although no update processing can be performed for a use case related to actor 3, actor 3 is added in a view having an input item associated with the actor. With this operation, when actor 3 is added in the "actor name" column in the actor list window 62, the name of actor 3 is additionally displayed in the "actor list" column in the use case list window 63.

If use case 3 is added in the "use case" column in the actor list window 62 thereafter, the relationship analyzing section 3 analyzes the relationship between actor 3 and use case 3. The updating section 56 then updates the definition contents corresponding to the remaining views on the basis of the analyzed relationship information. As a result, the name of use case 3 is also additionally displayed in the "use case name" column in the use case list window 63.

When the description contents of the requisition sheet are changed in the above manner, the contents of the matrix display view 65 for displaying the relationships between constituent elements are also updated and displayed. In the case shown in FIG. 11, this update/display processing is performed when an up-to-date button 69 is clicked. Note that the contents may be automatically updated and displayed without clicking this up-to-date button 69.

As described above, according to the second embodiment, views are prepared as input windows for describing a requisition sheet, and the requisition sheet can be described by using an arbitrary view, thereby allowing each operator to describe a requisition sheet by using an easy-to-write view. In addition, when the description contents are changed by using one view, the description contents of the remaining views are properly updated in accordance with the change. This makes it possible to greatly improve operability for the operator.

In this embodiment, a requisition sheet can be described on a diagram basis as well as on a text basis. This, for example, allows the operator to describe a requisition sheet by using a diagram-based view in a visually comprehensible state first, and then describe the requisition sheet in detail by switching to a text-based view. Obviously, a use case diagram corresponding to the requisition sheet described on a text basis first may be automatically created first, and then the requisition sheet may be corrected by using desired diagram- and text-based views. That is, the operator can selectively use views depending on a portion which can be easily defined on a diagram basis and a portion which is easily defined on a text basis.

Third Embodiment

The third embodiment of the present invention will be described next.

The third embodiment is configured to describe use cases, actors, and the like structurally in describing a requisition sheet in the form of use case. In this case, as a method of structurally describing use cases and actors, the UML (Unified Modeling Language) is used.

In the UML, three relationships, namely use (uses), generalization, and extension (extends) are defined as the types of relationships between constituent elements. "Use" includes a use between use cases. "Generalization" includes generalization between a use case and an actor. "Extension" includes an extension between use cases. The terms "use", "generalization", and "extension" used in this case are based on the corresponding definitions in version 1.1 of the UML, but may be replaced with the corresponding definitions in version 1.3 of the UML.

A characteristic feature of this embodiment is that when the relationship between use cases is to be defined, structuralization is implemented by making one of the events constituting a basic series in a given use case correspond to another use case. This allows the operator to comprehend easily the detailed relationships between use cases and actors when they are structuralized.

In this case, use indicates a relationship indicative that when there is a common sub-use case that can be used among use cases, the common sub-use case is used from a given use case. Generalization indicates a relationship indicative that a new use case or actor is created by partly changing a given use case or actor. Assume that use case A is considered as a base, and another use case B is defined by additionally describing the difference between use cases A and B. In this case, use case A is regarded as a use case obtained by generalizing use case B. Use case B is regarded as a use case obtained by specializing use case A. The relationship between these two cases is termed a generalization relationship. Extension indicates a relationship indicative that in a use case that defines the basic flow of events, another extended use case is processed when a given specific condition is satisfied.

FIG. 12 is a view showing an example of a use case input window according to this embodiment, and more specifically, a portion for defining a basic series. In the "basic series" input column in FIG. 12, as in the case shown in FIG. 2, the detailed contents indicting who executes what in the use case are described in an "event" column 71 and an "actor" column 72. At this time, if a common sub-use case is to be used in a specific event, the name of the common sub-use case to be used is described in a column 73 for use cases to be used (use UC).

In the case shown in FIG. 12, in the basic series of "use case 1", "use case 5" is defined as a common sub-use case to be used in "event 2". With this operation, a use relationship is established between "use case 1" and "use case 5".

In the input window shown in FIG. 12, a use UC creation button 74, specialization button 75, and extension button 76 are provided. Of these buttons, the use UC creation button 74 is a button for designating a sequence of events and instructing to create a common sub-use case.

When, for example, the operator designates an event sequence which he/she wants to set in a common sub-use case and clicks the use UC creation button 74 with the mouse, a window for prompting the operator to input the name and outline (object) of a common sub-use case having the designated event sequence as an element appears. A common sub-use case is created by inputting the name and outline (object) of the common sub-use case in this window and pressing the OK button.

FIGS. 13A to 13C are views for explaining operation to be performed in creating this common sub-use case. Referring to FIGS. 13A to 13C, in use case ① constituted by an event sequence having contents a to f, the contents a to d may be used in use cases and hence are to be created into a common sub-use case.

In this case, in original use case ① shown in FIG. 13A, the operator designates a sequence of events a to d to be created into a common sub-use case and clicks the use UC creation button 74. The operator further inputs "use case ②" as the name of the common sub-use case, together with "X" as an outline. As a result, common sub-use case ② like the one shown in FIG. 13B is created. In addition, as shown in FIG. 13C, use case ①' is automatically created, in which the sequence of four events a to d in original use case ① are replaced with one event X (using common sub-use case ②).

After common sub-use case ② is created in this manner, use cases other than use case ①' can use this common sub-use case ②.

In this manner, a common sub-use case is created to be commonly used in use cases, thus facilitating the reuse of use cases. This makes it possible to reduce the operation load on the operator in describing use cases.

The specialization button 75 is a button for giving an instruction to create a use case having a generalization relationship with a given use case. When, for example, the operator clicks the specialization button 75 in the input window shown in FIG. 12, a use case having an event sequence with the same contents as those displayed in the input window appears as another input window. When the operator changes desired portions and inputs the name and outline (object) of a new use case, and presses the OK button, another specialized use case having a generalization relationship with the original use case is created.

FIGS. 14A to 14C are views for explaining the operation to be performed in creating this specialized use case. Assume that there is use case ① constituted by an event sequence having contents a to e, as shown in FIG. 14A. In this case, when the operator presses the specialization button 75, an input window for another use case in which the sequence of events a to e in use case ① are directly reflected appears, as shown in FIG. 14B. At this time, a new use case to be specialized is created. In this stage, however, only information indicating the use case is obtained by specializing the original use case is stored in a new storage area, but any information about the contents is not stored.

The operator then changes a desired portion in the input window shown in FIG. 14B. In the case shown in FIG. 14B, the contents of event c are changed into event x. When the operator further inputs "use case ②" as the name of the use case for specialization, specialized use case ② is created, as shown in FIG. 14C. At this time, only difference data corresponding to the change portion of original use case ①, i.e., only the data of event x, is stored in the storage area for the use case for specialization. The data about the portions other than the changed portion are read out from the storage area in which original use case ① is stored, and displayed in the window.

In describing various use cases, the operator always has a chance of repeatedly inputting the same contents even when describing different use cases. In this case, according to the prior art, the operator describes all use cases from the beginning. According to this embodiment, in describing a given use case, the operator is allowed to use another use case that differs only partly from the given use case and describe only the definition of a different portion. This can greatly reduce the amount of work that the operator needs to do.

In a specialized use case, only the difference data with respect to the parent use case is stored. Even if, therefore, a common portion is corrected in the parent use case, the corrected contents are also reflected in the specialized use case, thereby always maintaining consistency properly. Therefore, as compared with the prior art in which the operator manually inputs all descriptions, this embodiment makes it possible to reduce correction omissions and input errors and describe a more accurate requisition sheet.

The extension button 76 is a button for giving an instruction to create a use case having an extension relationship with a given use case. When, for example, the operator clicks the extension button 76 in the input window shown in FIG. 12, another input window for describing an extended use case appears. In this case, the operator inputs a branch condition from the original use case and an event sequence to be executed when the condition is satisfied, together with a branch location to which the original use case branches, and a return location to which the original use case returns after the processing for the extended use case is completed. With this operation, another use case having an extension relationship with the original use case is created.

FIGS. 15A and 15B are views for explaining the operation to be performed in creating this extended use case. Assume that there is use case ① constituted by an event sequence having contents a to e, as shown in FIG. 15A. In this case, when the operator presses the extension button 76, another input window for describing an extended use case appears. In this case, the operator inputs a sequence of events x to z including the contents of a branch condition, event c as the branch location of original use case ①, and event d as a return location to which original use case ① returns after the sequence of events x to z in the extended use case are input. As a result, extended use case ② like the one shown in FIG. 15B is created.

Figure 16:
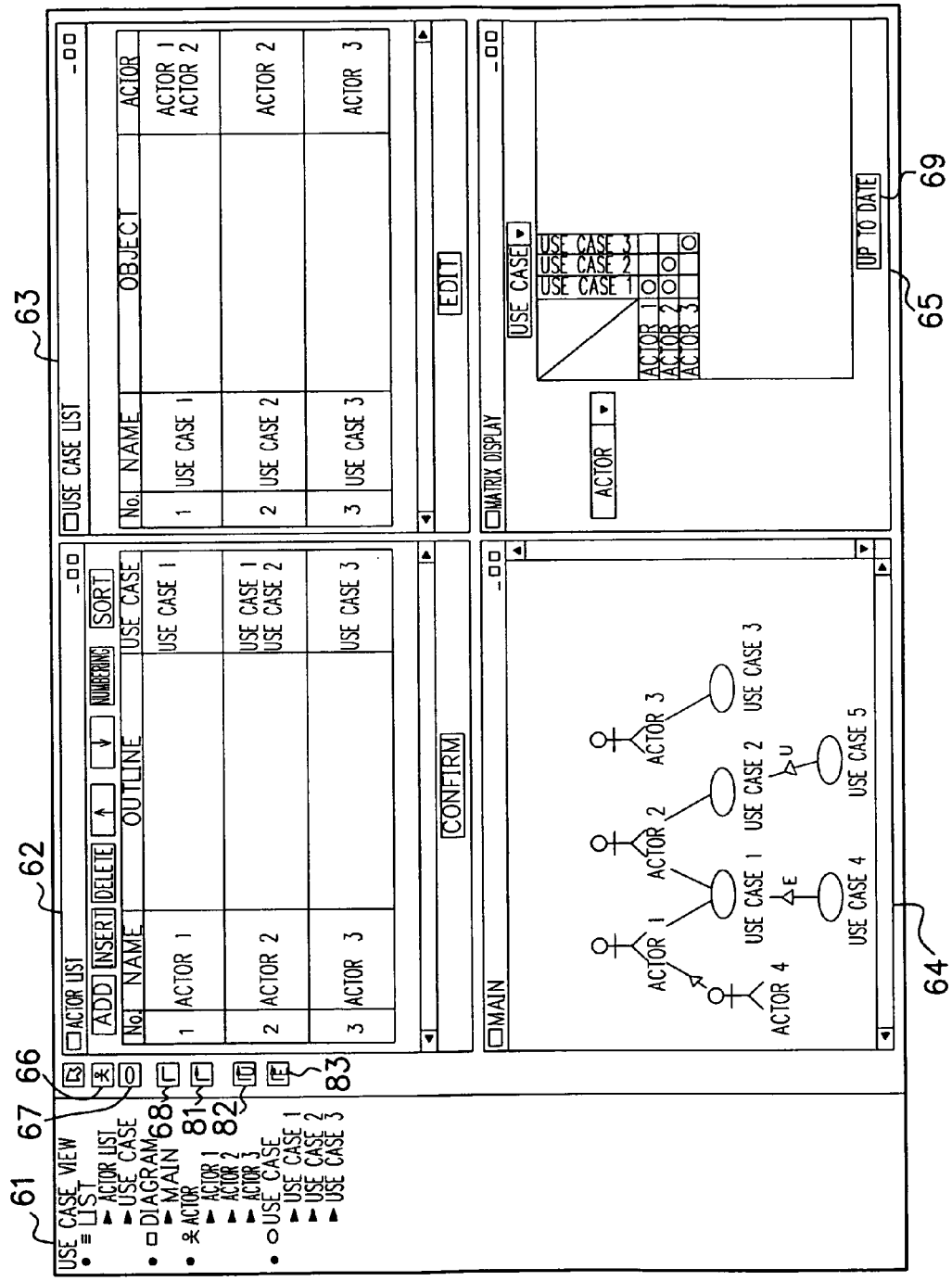
FIG. 16 is a view showing an example of a display screen having views according to the third embodiment.

In the above case, structuralized use cases and the like are described on a text basis. As in the second embodiment, however, the structuralized use cases and the like may be described on a diagram base. FIG. 16 is a view showing an example of the display window according to this embodiment.

More specifically, when structuralized relationships are to be described in the diagram window 64 shown in FIG. 16, the operator can add the generalization relationship between use cases or actors by clicking a generalization button 81, and can add the use relationship between a use case and a common sub-use case by clicking a use button 82. In addition, the operator can add the extension relationship between use cases by clicking an extension button 83. When the detailed contents of such a relationship are to be defined, the operator clicks, for example, the corresponding icon in the diagram window 64 with the mouse to display a text-based input window.

Figure 17:
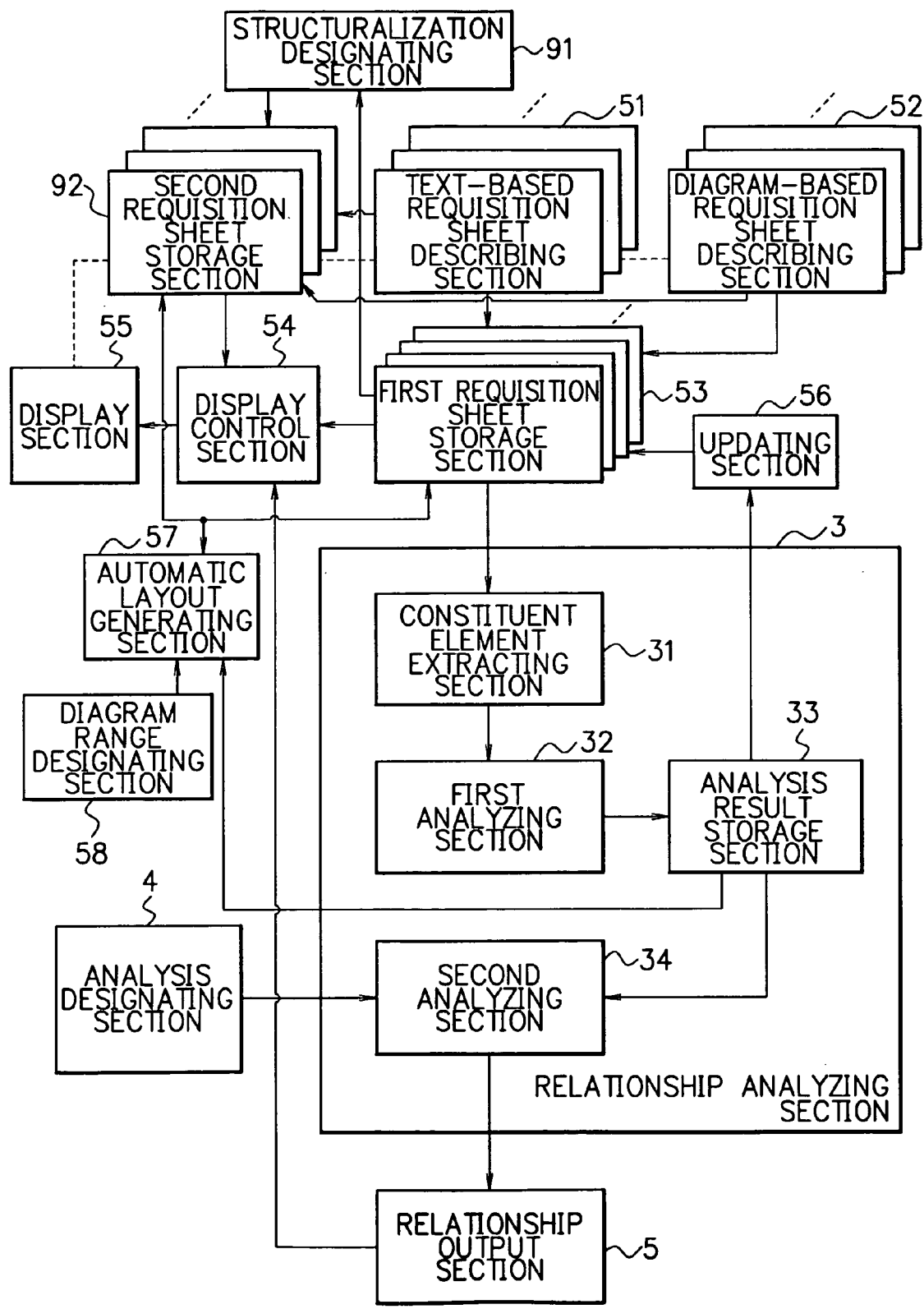
FIG. 17 is a block diagram showing the elementary characteristics of a description support apparatus for requisition sheet according to the third embodiment.

FIG. 17 is a block diagram showing the elementary characteristics of a description support apparatus for requisition sheet according to the third embodiment of the present invention. The same reference numerals as in FIG. 10 denote parts having the same functions in FIG. 17, and a detailed description thereof will be omitted.

In the description support apparatus for requisition sheet shown in FIG. 17, a structuralization designating section 91 and second requisition sheet storage section 92 are added to the arrangement shown in FIG. 10. The structuralization designating section 91 designates one of the use, generalization, and extension relationships with respect to the information of a requisition sheet stored in a first requisition sheet storage section 53. The structuralization designating section 91 designates a structuralization range, as needed, as well as designating one of these three types of relationships.

The second requisition sheet storage section 92 stores requisition sheet information having a use, generalization, or extension relationship with the original requisition sheet information (use cases and actors) stored in the first requisition sheet storage section 53. Although the first requisition sheet storage section 53 and second requisition sheet storage section 92 are arranged as separate sections, data may be stored in different areas in the same storage section.

Assume that a common sub-use case is to be created from events in an event sequence in a given use case stored in the first requisition sheet storage section 53. In this case, the operator uses the structuralization designating section 91 to designate a range in the event sequence as a target, as well as a use relationship. The operator also uses the text-based requisition sheet describing section 51 or diagram-based requisition sheet describing section 52 to describe necessary items (the object, pre-condition, post-condition, and the like of the corresponding common sub-use case), thereby creating requisition sheet information about the common sub-use case in the second requisition sheet storage section 92.

When the operator is to specialize a given use case stored in the first requisition sheet storage section 53 so as to create another use case, he/she designates a generalization relationship by using the structuralization designating section 91. At this time, an area for storing a use case for specialization is ensured in the second requisition sheet storage section 92. In this stage, however, only information indicating that this use case is obtained by specializing the original use case is stored in this new storage area.

The operator further corrects a desired portion and describes necessary items (the object, pre-condition, post-condition, and the like of the use case for specialization) by using a text-based requisition sheet describing section 51 or diagram-based requisition sheet describing section 52, thereby creating requisition sheet information about the specialized use case in the second requisition sheet storage section 92. At this time, the information stored in the second requisition sheet storage section 92 is only difference data with respect to the original use case stored in the first requisition sheet storage section 53.

When the operator is to extend a given use case stored in the first requisition sheet storage section 53 so as to create another use case, he/she designates an extension relationship by using the structuralization designating section 91. The operator further describes necessary items (the object, pre-condition, basic series, post-condition, and the like of the corresponding extended use case) by using the text-based requisition sheet describing section 51 or diagram-based requisition sheet describing section 52, thereby creating requisition sheet information about the extended use case in the second requisition sheet storage section 92.

A display control section 54 controls a display section 55 selectively to display that information, of the requisition sheet information corresponding to each view and stored in the first requisition sheet storage section 53 and second requisition sheet storage section 92, which corresponds to a designated view. At this time, for example, the display control section 54 can display only the difference between the requisition sheet information structuralized by generalization and the original requisition sheet information or information obtained by combining and developing these two pieces of information.

As described above, according to the third embodiment, use cases and actors can be structuralized according to use, generalization, and extension relationships. If, therefore, a common sub-use case is created by using, for example, a use relationship, the common sub-use case can be used from use cases. This facilitates the reuse of use cases. If a common sub-use case is created by extracting some events from an event sequence included in a given use case, the extracted portion in the original use case can be automatically replaced with the description of the common sub-use case. This makes it possible to reduce the operation load on the operator in defining use cases.

Assume that various use cases are defined by creating use cases and actors by using a generalization relationship. In this case, the operator need not repeatedly input common portions between the use cases, and needs only to input only different portions. In this case, the operator can correct necessary portions upon displaying the same contents as those of the original use case in the input window instead of displaying and describing only different portions. This allows the operator to describe only the different portions while comprehending the whole contents of the use case.

In a specialized use case, only the different data with respect to the original use case is stored. Even if, therefore, a common portion is corrected in the original use case, the corrected contents are also reflected in the specialized use case, thereby always maintaining consistency properly. This makes it possible to reduce correction omissions and input errors and describe a more accurate requisition sheet. In addition, the operator can define a view in accordance with necessity, e.g., a view for displaying only the differences between a specialized use case and the original use case or a view for displaying information obtained by combining and developing the two use cases.

If, for example, the operator creates a use case by using an extension relationship, a conditional branch can be caused from a specific event in a given use case to another use case. In this case, since one event is related to one use case, the detailed relationship set when use cases are structuralized can be easily comprehended (this also applies to a case wherein structuralization is performed on the basis of a use relationship).

In this embodiment, since a requisition sheet can be described on a diagram basis as well as on a text basis, the operator can easily comprehend structuralized relationships at a glance. Furthermore, the operator can selectively use views depending on a portion that can be easily defined on a diagram basis and a portion that can be easily defined on a text basis.

Fourth Embodiment

Figure 18:
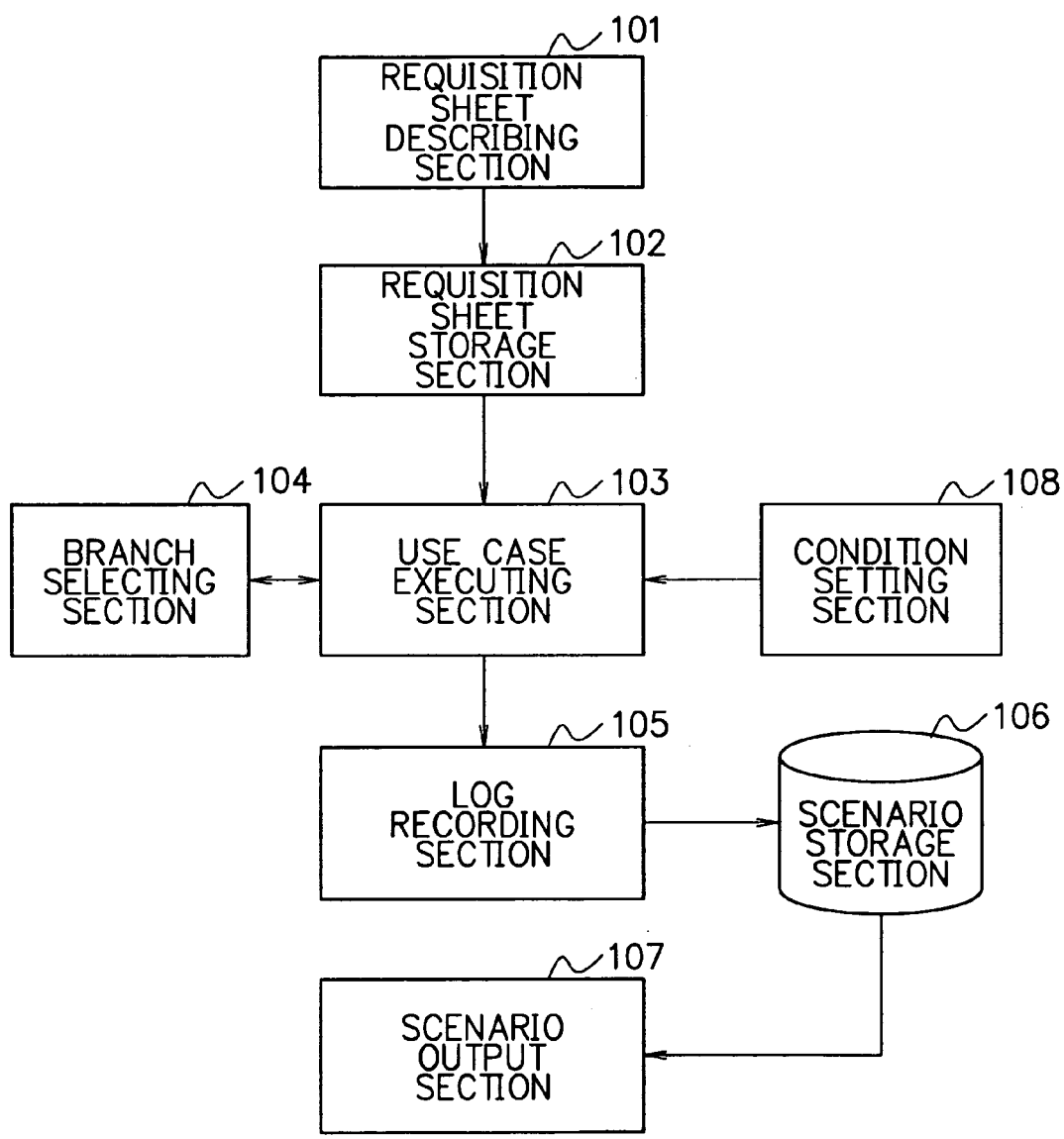
FIG. 18 is a block diagram showing the elementary characteristics of a description support apparatus for requisition sheet according to the fourth embodiment.

FIG. 18 is a block diagram showing elementary characteristics of a description support apparatus for requisition sheet according to the fourth embodiment of the present invention.

Referring to FIG. 18, a requisition sheet describing section 101 describes a requisition sheet in the form of use case according to a predetermined format. In this case, in a use case, in consideration of the manner in which a system to be developed is used in business operation, a sequence of actions (events) and the like that are performed by an operator during the operation of a system is described in units of transactions in a natural language.

Figure 19:
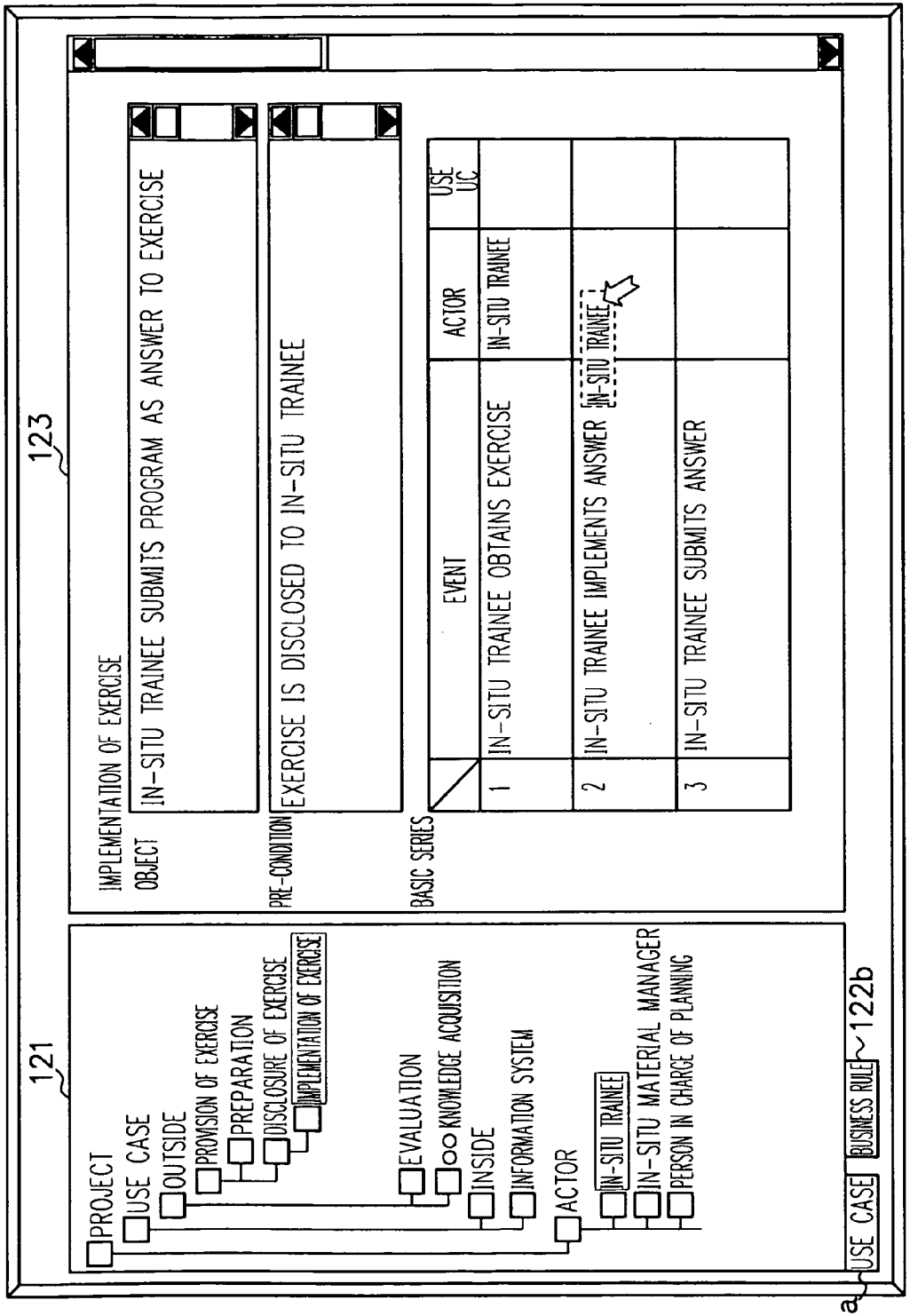
FIG. 19 is a view showing an example of an input window for a use case including a basic series.

FIG. 19 is a view showing an example of an input window for a requisition sheet according to this embodiment. Referring to FIG. 19, a tree structure display window 121 is for displaying a requisition sheet model that defines a development project for a given system in the form of a tree structure. Tags 122a and 122b are provided below the window 121. When one tag 122a is clicked, a use case input window is displayed, as shown in FIG. 19. When the other tag 122b is clicked, a business rule input window (not shown) is displayed. The business rule indicates a rule that should be observed in executing business operation by using the developed system.

FIG. 19 shows an example of information to be defined as a requisition sheet for a project to develop an education system for programming. A list of use relationships of use cases and actors (each indicating who performs each action in use cases) in the project is displayed in the tree structure display window 121. According to this tree structure, "use case" and "actor" are subordinate to "project", and "outside", "inside", and "information system" are subordinate to "use case".

In this case, the use relationship between the use cases in use case "outside" is shown, in particular. More specifically, use cases termed "provision of exercise", "evaluation", and "○○ knowledge acquisition" are subordinate to the level of use case "outside", and use cases termed "preparation" and "disclosure of exercise" are subordinate to "provision of exercise". In addition, a use case termed "implementation of exercise" is subordinate to "disclosure of exercise".

As described above, a requisition sheet associated with a project to produce a given business operation system is comprised of use cases describing individual business operations as units to be performed in the system.

When, for example, an operator clicks an arbitrary use case portion in the tree structure display window 121 with the mouse, an input window 123 for the use case is displayed on the right side of the tree structure display window 121.

FIG. 19 shows a case wherein the operator clicks a use case portion corresponding to "implementation of exercise". In this use case input window 123, an input window for an object, pre-condition, basic series, alternative series, post-condition, and data is displayed after the display of the use case name. Although FIG. 19 does not show input windows for the alternative series, post-condition, and data, the operator can see them by scrolling down the use case input window 123.

In the "object" column in the above use case input window 123, the rough contents of business operation to be executed in the use case are defined. In the "pre-condition" column, a condition that must be satisfied before the execution of the business operation is defined. In the case shown in FIG. 19, a pre-condition for the submission of an answer to an exercise as an object of "implementation of exercise" is defined such that the exercise should be disclosed to an in-situ trainee.

In the "post-condition" column, a specific condition to be set after the execution of the operation defined in the use case is defined. For example, the operator defines conditions after the operation in both a case wherein the operation ends in success and a case wherein the operation ends in failure. In this case, for example, the operator may describe a use case to be executed next so as to establish a link to the jump destination of the use case. In the "data" column, specific data to be input/output in the execution of the actions (events) defined in the use case are defined.

In the "basic series" column, detailed contents indicating, for example, who performs what in the use case are defined. In this case, events indicating the detailed operation contents that indicate the basic flow of business operations, actors indicating specific persons who execute the events, and other use cases to be used in the execution of the events are sequentially described for the respective operations. FIG. 19 shows a state wherein the operator drags "in-situ trainee" from the tree structure display window 121 and drops it in the "actor" column.

In the "alternative series" column, as in the "basic series" column, detailed contents indicating who performs what in the use case are defined. In the "basic series" column, events indicating the basic flow of business operations are described, whereas in the "alternative series" column, events indicating the exceptional flow of business operations are described. FIG. 20 is a view showing an example of an input window for this alternative series.

As shown in FIG. 20, in the "alternative series" column, the following data are sequentially described for each operation: the number of a basic series as a target to be replaced with an alternative, an event indicating the detailed contents of operation to be performed in place of the event in the basic series, another use case to be used in the execution of the event, and a post-process indicating the contents of a process to be performed after the execution of the event.

In the case shown in FIG. 20, the event in the alternative series is defined such that when the actor performs the third process (submission of an answer) from above in FIG. 19, and cannot solve the question, he/she can ask an instructor a question. The post-process is defined such that after the event of the question is over, the actor returns to the third process in the basic series. For example, the post-process may also be defined as follows. After the event in the alternative series is over, the processing is terminated without returning to the basic series. Alternatively, the flow of processing may jump to an event in another basic series or alternative series.

When the number of a basic series as a target to be replaced, post-process, and the like are described in the "alternative series" column in this manner, a link is established between a use case in the basic series and a use case in the alternative series. The portion where the link is established between the basic series and the alternative series in this manner will appear as the branch point of a use case to be executed next in creating a scenario representing the process of execution of the use case.

The use case to be executed next is designated by describing information in the use UC (Use Case) column of a use case in the level immediately above. After the basic series of the use case to be used is over, the flow of processing returns to the execution of the use case that uses that use case. When the entire basic series of the use case that is started first is completed, one scenario is completed.

As described above, in this embodiment, since a requisition sheet is described by inputting various pieces of information in a natural language that allows everyone to have the same understanding, unlike drawings and the like, the correspondence between the function of a system to be developed and business operation to be executed by using it can be clarified. This makes it possible to minimize misunderstanding. In this case, since the operator is allowed to describe information about predetermined input items, he/she can easily describe use cases and can easily input information. As shown in FIG. 19, since an input item can also be described by drag and drop, input errors can be prevented.

The requisition sheet describing section 101 in FIG. 18 sequentially inputs use cases, each including various pieces of information such as an object, condition, basic series, alternative series, and data, in units of business operations on the basis of the format input window shown in FIG. 19, and also sequentially inputs corresponding business rules in units of business operations. A requisition sheet storage section 102 is used to store the requisition sheet information input in this manner. In this case, the requisition sheet information is stored for each defined use case and business rule.

A use case executing section 103 sequentially executes the respective use cases included in the requisition sheet on the basis of the requisition sheet information written according to a predetermined standard as shown in FIG. 19 and stored in the requisition sheet storage section 102. More specifically, in accordance with the links established in describing the respective use cases, the use cases at the destinations of the links are sequentially displayed on the monitor. In this case, if a branch is to be caused at a use case, choices as branch destinations are displayed to allow the user to select the next use case to be executed. This use case is selected by using a branch selecting section 104 for selecting/designating one of the displayed choices with a pointing device such as a mouse.

A log recording section 105 serves to obtain a log of use cases used in the past by recording the process of execution of each use case by the use case executing section 103. More specifically, every time a use case is read out or displayed on the monitor, the log recording section 105 sequentially records the use case, thereby creating a scenario indicating the flow of processing for use cases on the system, i.e., the manner in which a series of business operations are implemented on the system.

The scenario created in this manner is stored in a scenario storage section 106 formed by, for example, a database. A scenario output section 107 outputs the created scenario to the monitor at the same time or at an arbitrary point of time after the scenario is stored in the scenario storage section 106. The user can easily comprehend the operation of the system described as a requisition sheet by referring to the displayed scenario.

Figure 21:
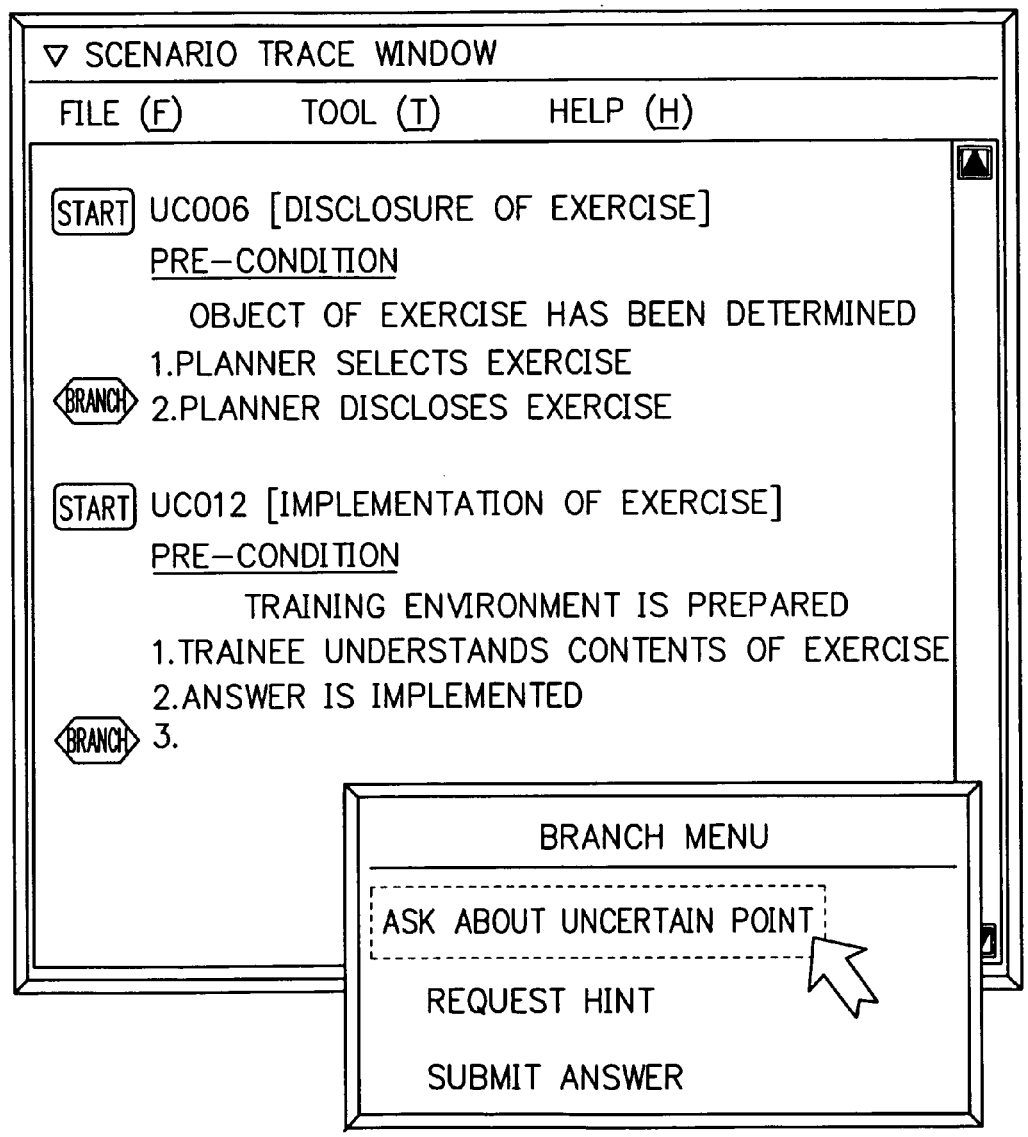
FIG. 21 is a view showing an example of a window appearing while the description support apparatus for requisition sheet according to this embodiment is creating a scenario by interactive processing with a user.

FIG. 21 is a view showing an example of a window displayed while the description support apparatus for requisition sheet according to this embodiment is creating a scenario by interactive processing with the user.

FIG. 21 shows a case wherein "disclosure of exercise" (use case number: UC006) is designated, and a scenario creation command is executed. In this case, first of all, the use case executing section 103 loads the use case "disclosure of exercise" from the requisition sheet storage section 102, and displays the pre-condition and an event in the basic series described in the use case.

In this case, if, for example, an event in an alternative series is defined with respect to a given event in the basic series, a branch menu indicating choices as branch destinations pops up. When the user selects any of the branch destinations by using the branch selecting section 104, the selected contents are displayed. If a branch is to be caused, the mark <branch> is displayed as shown in FIG. 21. In the use case "disclosure of exercise" in FIG. 21, an event in the event termed "exercise is disclosed" in the basic series is selected from the displayed branch menu.

When the branch destination is selected as described above, the next use case is read out from the requisition sheet storage section 102 and displayed in accordance with the link defined in describing the requisition sheet. Referring to FIG. 21, the use case "implementation of exercise" (use case number: UC012) is read out and displayed. In this use case, the event in the alternative series is defined with respect to the third event in the basic series, and the branch menu indicating choices as branch destinations pops up.

When use cases are sequentially executed by interactive processing by the use case executing section 103 and branch selecting section 104, the log recording section 105 sequentially records the use cases used in the process of execution on the scenario storage section 106. FIG. 22 shows examples of such scenarios created in the above manner. FIG. 22 shows three scenarios 001 to 003 (each having a list of used use cases). These scenarios are created by selecting different branch destinations at a branch point that has occurred in the process of executing a use case.

Figure 23:
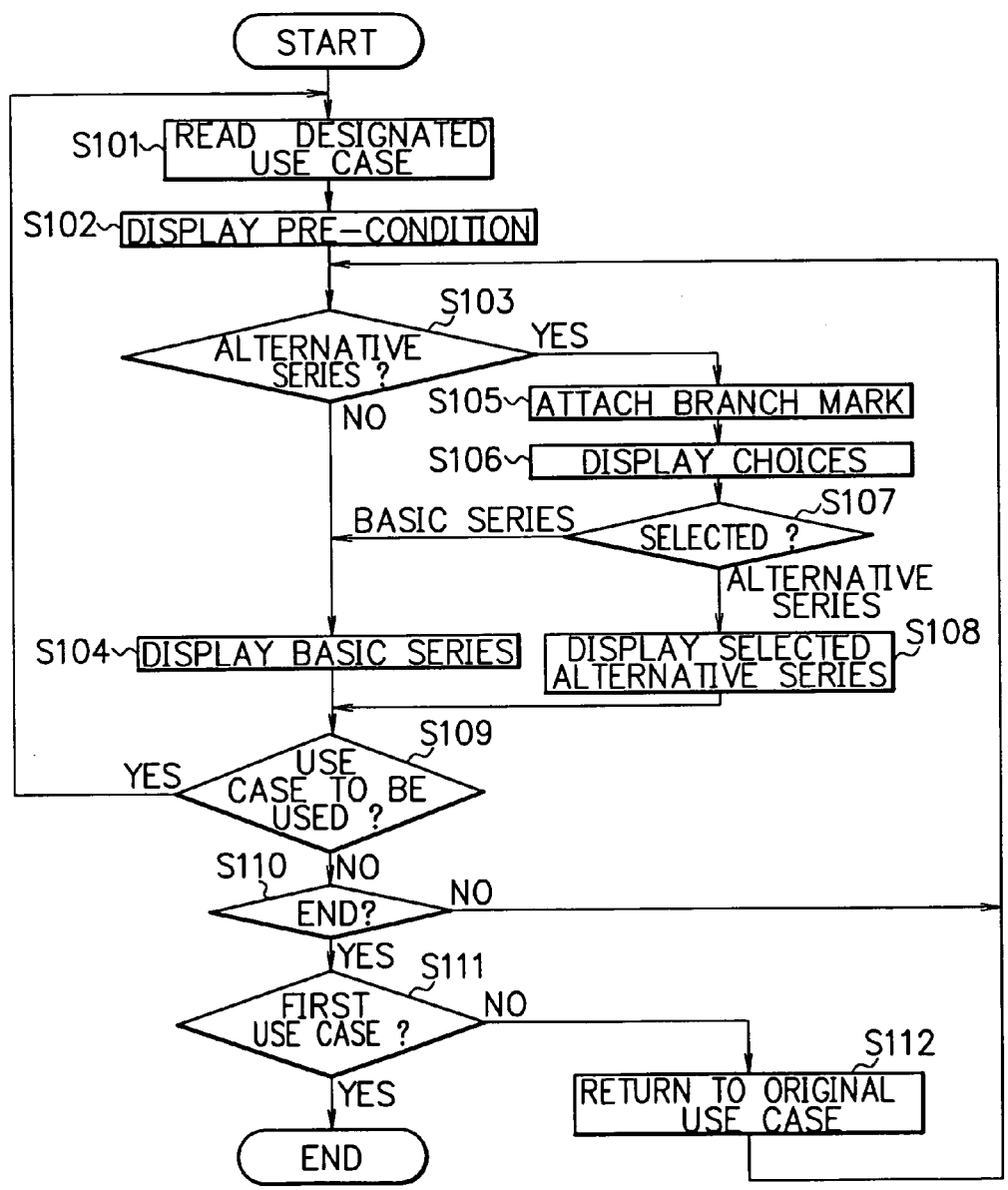
FIG. 23 is a flow chart showing the operation performed by a use case executing section in FIG. 18.

FIG. 23 is a flow chart showing the operation of the use case executing section 103. Referring to FIG. 23, when the user designates a specific use case and the execution of creation of a scenario, the use case executing section 103 reads out the designated use case from the requisition sheet storage section 102 in step S101. In step S102, the pre-condition described in the readout use case is displayed.

In step S103, it is checked whether an alternative series is defined in the use case. If NO in step S103, the flow advances to step S104 to display a basic series. If an alternative series is present, the flow advances to step S105 to display the alternative series with a branch mark like the one shown in FIG. 21. In step S106, choices (selection menu) including events in the alternative series and events in the basic series as a target to be replaced pop up.

In step S107, it is checked whether a basic series or alternative series is selected from the displayed choices. If it is determined that the basic series is selected, the flow advances to step S104 to display the selected event in the basic series. It is further checked in step S109 whether there is a use case to be used. If NO in step S109, the flow advances to step S110 to check whether the execution of the use case is completed. If NO in step S110, the flow returns to step S103 to execute the above operation again.

If it is determined in step S110 that the use case is completed, the flow advances to step S111 to check whether the completed use case is the first activated use case. If YES in step S110, the processing is terminated. If NO in step S110, the flow advances to step S112 to return to the execution of the original use case which is a use case in the level immediately above. The flow then returns to step S103 to execute the above operation again.

If it is determined in step S109 that there is a use case to be used, the flow returns to step S101 to read out this use case from the requisition sheet storage section 102. The processing in step S102 and the subsequent steps is performed for the new use case in the same manner as described above.

If an alternative series is selected in step S107, the flow advances to step S108 to display an event in the selected alternative series following the preceding display. In addition, it is checked in step S109 whether there is a use case to be used. If YES in step S109, the flow returns to step S101 to read out this use case from the requisition sheet storage section 102. The processing in step S102 and the subsequent steps is then performed for the new use case in the same manner as described above. If NO in step S109, the flow advances to step S110. Thereafter, the above processing is executed.

When the use case executing section 103 executes operation like that shown in FIG. 23, use cases are sequentially executed by interactive processing with the user. At this time, the log recording section 105 in FIG. 18 records each executed use case as a log on the scenario storage section 106 every time it is executed, thus automatically creating a scenario indicating the process of execution of each use case. That is, the user can create a scenario indicating the operation of the system by only selecting a branch destination as needed.

The user can easily check the operation of the system by seeing this created scenario. This makes it easy to verify consistency in the requisition sheet for the business process in the system, and can easily comprehend problems in the business process. Assume that there is a use case that must be handled without exception. In this case, the user can easily check omissions of a use case and description or the presence/absence of an unexecuted use case by checking whether the above use case is used in the scenario.

In addition, the operation of the system can be checked as a log by referring to the scenario created in the above manner. In addition, in this embodiment, since the respective use cases are sequentially executed by interactive processing with the user, the user can simulate the operation of the system for which the requisition sheet is described by using the use cases before the system is actually designed and implemented.

For this reason, the user can simulate this system before the system is designed/implemented on the basis of the described requisition sheet. By correcting the requisition sheet in this stage as needed, the requisition sheet required for the development of the system can be described finally without any contradiction and omission and with user's satisfaction. This makes it possible to minimize the occurrence of the inconvenience of redoing operation in the subsequent design stage or implementation stage and greatly reduce the cost for system development.

In the above embodiment, a branch point occurs in a portion in which an alternative series is defined. However, the user may describe use cases as jump destinations in the "post-condition" column in the use case input window so as to set a branch point for the execution of a use case. In this case, a branch menu indicating choices as branch destinations is displayed at a portion in which branch destinations are defined by a post-condition as well as at a portion in which an alternative series is defined.

In the above embodiment, at a branch appearing in the process of executing a use case, the user is made to select a use case to be executed next, thereby creating a scenario on the basis of interactive processing with the user. However, the present invention is not limited to such a technique.

For example, the apparatus may be configured to automatically select a use case to be executed at a branch point so as automatically to create several scenarios. In this case, as shown in FIG. 18, the apparatus may have a condition setting section 108 to provide the use case executing section 103 with conditions for the execution of the respective use cases (e.g., a condition stating that a use case should be executed within a basic series without jumping to an alternative series) in advance, and a scenario may be created by automatically performing branch processing within the range of the condition.

When a scenario is to be created by automatically causing a branch in the above manner, the scenario may be automatically created by selecting one or types of patterns as branch destinations. Alternatively, scenarios of all patterns may be automatically created by sequentially selecting all branch destinations that can be taken as use cases to be executed next at each branch point.

In this embodiment, only the names and numbers of use cases are contained in a scenario to be recorded, as shown in FIG. 23. However, other constituent elements constituting a use case, e.g., actors associated with the use case and data to be input/output, may be displayed together. According to a scenario recorded in this embodiment, the user cannot comprehend any specific branch point and any specific branch by only seeing the scenario. Therefore, a log recording only branch conditions may be recorded inside or outside the scenario.

In the above embodiment, the user determines an omission of a use case that must be executed without any exception by visually checking a created scenario. By setting such a use case in advance, the apparatus may automatically check it. In order to check whether a scenario is stopped in progress, the apparatus may be configured to automatically check whether the scenario is stopped at a specific use case. In addition, in these cases, error messages may be output if any errors are detected.

Fifth Embodiment

The fifth embodiment of the present invention will be described next.

The fifth embodiment is configured to describe use cases, actors, and the like structurally in describing a requisition sheet in the form of use case. In this case, as a method of structurally describing use cases and actors, the UML (Unified Modeling Language) is used.

A characteristic feature of this embodiment is that when the relationship between use cases is to be defined, structuralization is implemented by making one of the events constituting a basic series in a given use case correspond to another use case. This allows the operator to comprehend easily the detailed relationships between use cases and actors when they are structuralized.

Figure 24:
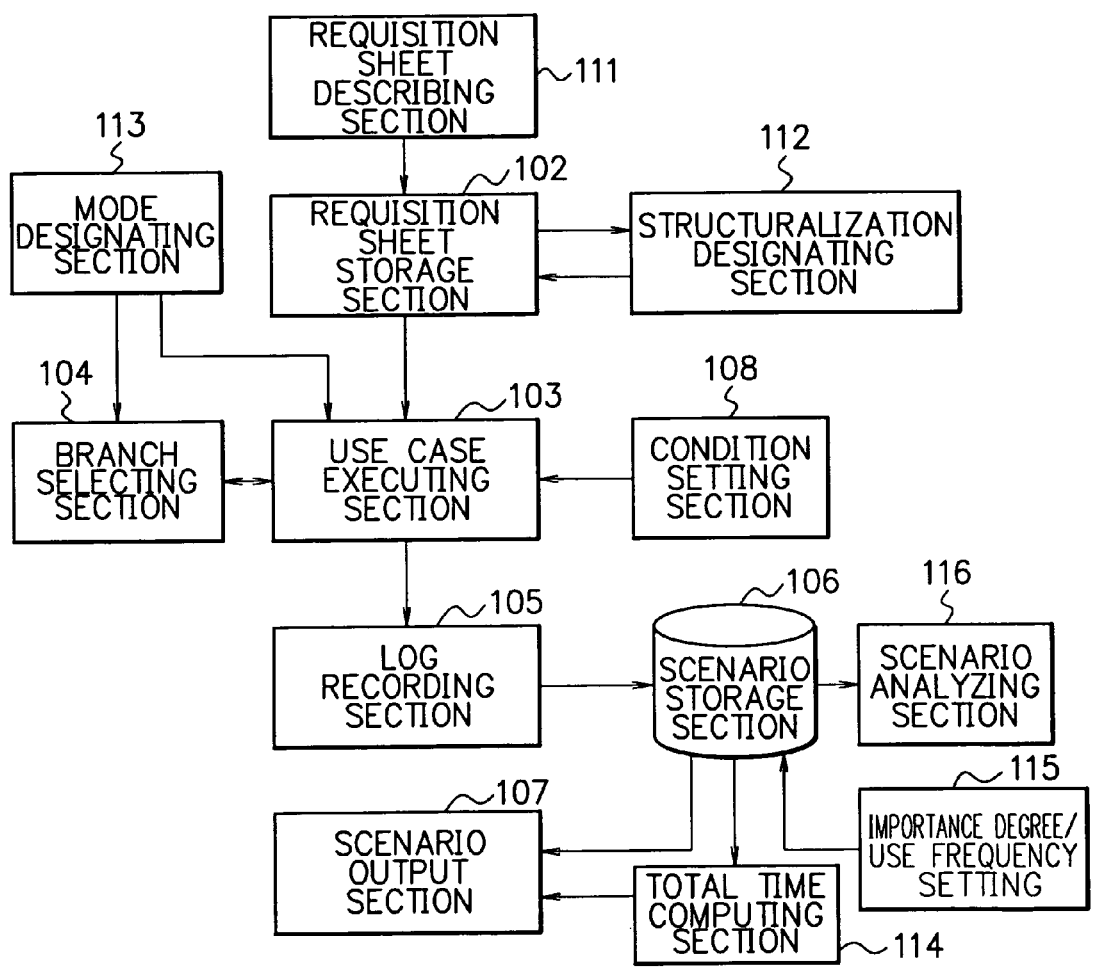
FIG. 24 is a block diagram showing the elementary characteristics of a description support apparatus for requisition sheet according to the fifth embodiment.

FIG. 24 is a block diagram showing elementary characteristics of a description support apparatus for requisition sheet according to the fifth embodiment of the present invention. The same reference numerals as in FIG. 18 denote parts having the same functions in FIG. 24, and a detailed description thereof will be omitted.

Referring to FIG. 24, a requisition sheet describing section 111, like the requisition sheet describing section 101 in FIG. 18, describes a requisition sheet in the form of use case in accordance with a predetermined format. The requisition sheet describing section 111 in this embodiment also describes time information indicating how much time is required to execute business operation represented by each use case (e.g., the minimum required time).

A structuralization designating section 112 designates one of the use, generalization, and extension relationships with respect to the information on a requisition sheet stored in a requisition sheet storage section 102. The structuralization designating section 112 designates a structuralization range, as needed, as well as designating one of these three types of relationships. Requisition sheet information having the use, generalization, and extension relationships created by the structuralization designating section 112 from the original requisition sheet information stored in the requisition sheet storage section 102 is also stored in the requisition sheet storage section 102.

Assume that a common sub-use case is to be created from events in an event sequence in a given use case stored in the requisition sheet storage section 102. In this case, the operator uses the structuralization designating section 112 to designate a range in the event sequence as a target, as well as a use relationship. The operator also uses the requisition sheet describing section 111 to describe necessary items (the object, pre-condition, post-condition, and the like of the corresponding common sub-use case), thereby creating requisition sheet information about the common sub-use case in the requisition sheet storage section 102.

When the operator is to specialize a given use case stored in the requisition sheet storage section 102 so as to create another use case, he/she designates a generalization relationship by using the structuralization designating section 112. At this time, an area for storing a use case for specialization is ensured in the requisition sheet storage section 102. In this stage, however, only information indicating that this use case is obtained by specializing the original use case is stored in this new storage area.

The operator further corrects a desired portion and describes necessary items (the object, pre-condition, post-condition, and the like of the use case for specialization) by using the requisition sheet describing section 111, thereby creating requisition sheet information about the specialized use case in the requisition sheet storage section 102. At this time, the information stored in the requisition sheet storage section 102 is only difference data with respect to the original use case stored in the requisition sheet storage section 102.

When the operator is to extend a given use case stored in the requisition sheet storage section 102 so as to create another use case, he/she designates an extension relationship by using the structuralization designating section 112. The operator further describes necessary items (the object, pre-condition, basic series, post-condition, and the like of the corresponding extended use case) by using the requisition sheet describing section 111, thereby creating requisition sheet information about the extended use case in the requisition sheet storage section 102.

A mode designating section 113 designates a simple mode of recording a single log or a detailed mode of recording a detailed log when the use cases included in a requisition sheet are sequentially executed by using a use case executing section 103 and branch selecting section 104, and the process of execution is recorded. The mode information designated by the mode designating section 113 is sent to the use case executing section 103 and branch selecting section 104. The use case executing section 103 and branch selecting section 104 then perform processes corresponding to the designated mode.

In the simple mode, as in the fourth embodiment, a scenario is created while each use case at a corresponding link destination is sequentially read out from a given use case in accordance with the links established between use cases in a basic series and use cases in an alternative series. Each scenario created when this simple mode is designated represents only the flow between use cases, as shown in FIG. 22.

In the detailed mode, a scenario is created while each use case at a corresponding link destination is sequentially read out from an event in a given use case in accordance with structuralized use, generalization, and extension relationships as well as the links established between use cases in a basic series and use cases in an alternative series. As described above, the structuralized relationship between use cases is the relationship established between the events constituting a given use case and another use case. Therefore, each scenario created when this detailed mode is designated represents not only the flow of use cases but also the flow of events in each use case, as shown in FIG. 25.

Figure 25:
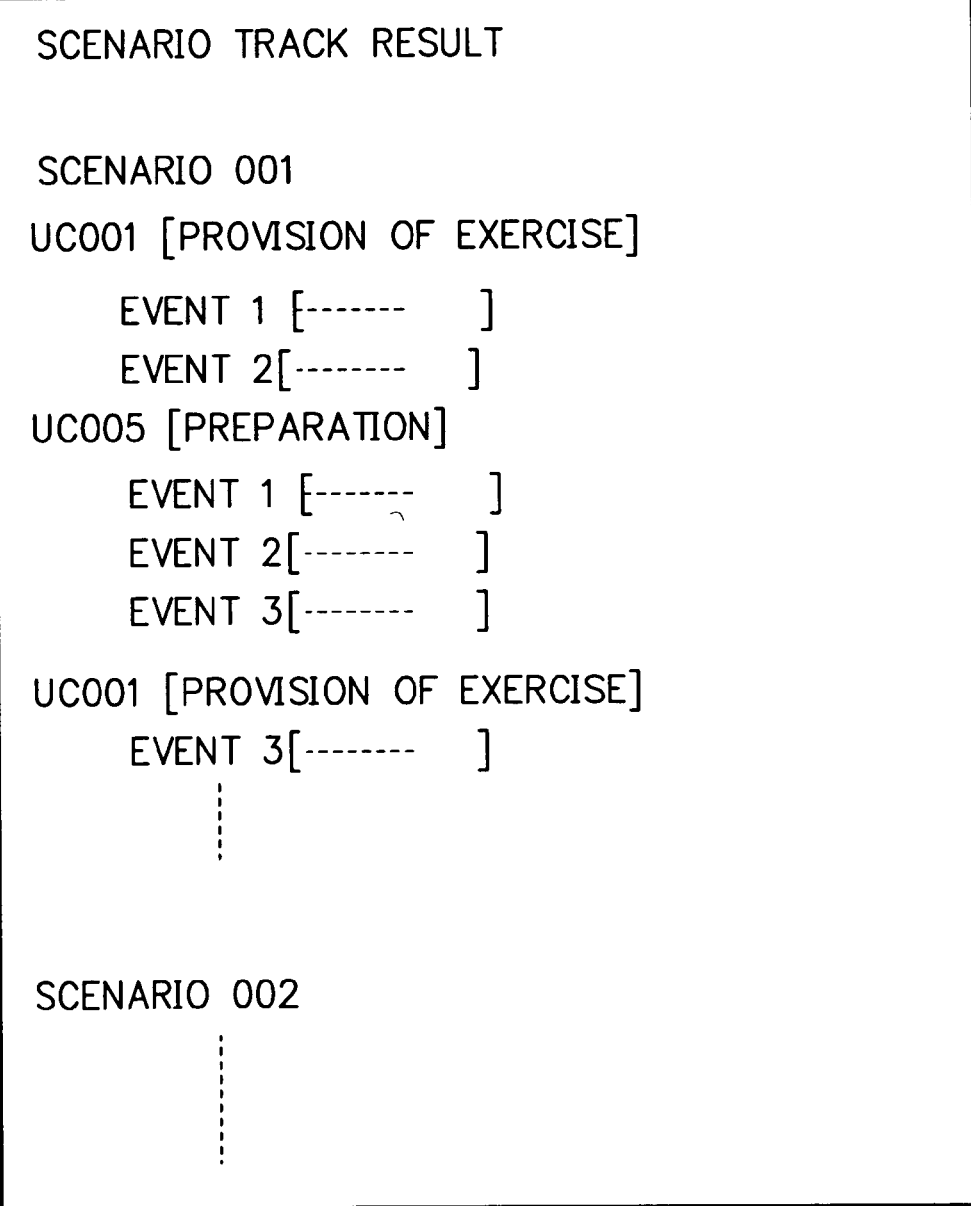
FIG. 25 is a view showing examples of scenarios created in the fifth embodiment.

According to scenario 001 in FIG. 25, the following procedure is recorded as a log. Events 1 to 3 in use case 005 are executed after events 1 and 2 in use case 001 are processed. Thereafter, the flow returns to use case 001 to continue processing from event 3. As described above, according to scenarios in this embodiment, the operator can comprehend the flow of processing in detail and check in more detail whether the requisition sheet is properly described, e.g., the description of any use case is omitted or any unexecuted use case is present.

Figure 26:
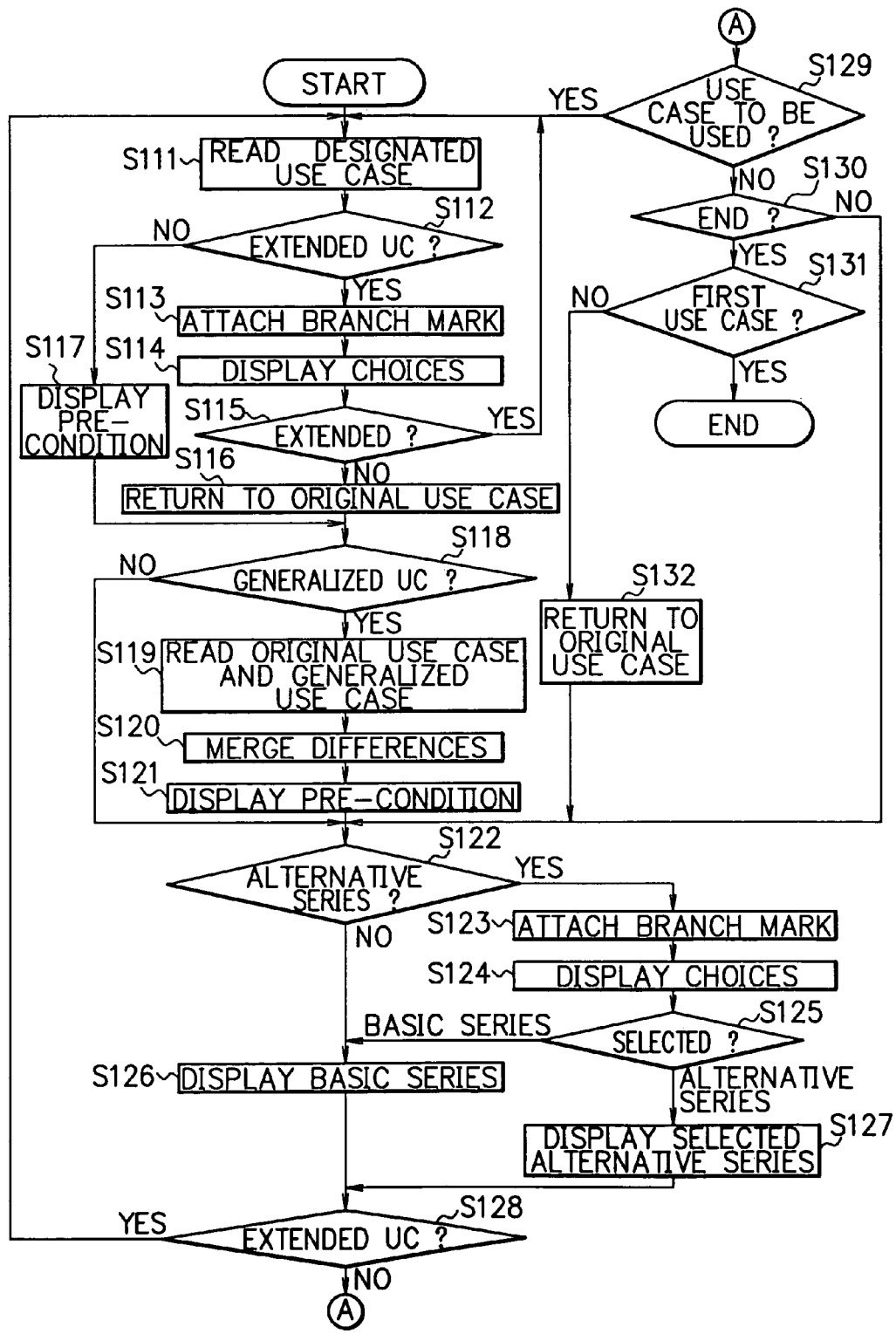
FIG. 26 is a flow chart showing the operation performed by a use case executing section in FIG. 24.

FIG. 26 is a flow chart showing the operation of the use case executing section 103 in creating a scenario in the detailed mode. Referring to FIG. 26, when the user designates a specific use case and the execution of creation of a scenario, the use case executing section 103 reads out the designated use case from the requisition sheet storage section 102. In step S112, it is checked whether an extended use case is defined with respect to the readout use case.

If YES in step S112, the flow advances to step S113 to display the use case with a branch mark like the one shown in FIG. 21 being attached. In step S114, choices (selection menu), pop up, which include the first event in the extended use case and events in the original use case as a target to be extended.

In step S115, it is checked whether an event in the extended use case is selected from the displayed choices. If YES in step S115, the flow returns to step S111 to read out the selected extended use case from the requisition sheet storage section 102. The readout extended use case is processed in the same manner as described above. If NO in step S115, the flow returns to the execution of the original use case in step S116. The flow then advances to step S118.

If it is determined in step S112 that no extended use case is defined for the use case read out from the requisition sheet storage section 102, the pre-condition described in the readout use case is displayed in step S117. The flow then advances to step S118.

In step S118, it is checked whether the target use case is obtained by specializing another use case. If YES in step S118, the flow advances to step S119 to read out the original use case and difference data of the use case obtained by specializing the original use case from the requisition sheet storage section 102. In step S120, a specialized use case is created by combining the above readout original use case and the difference data of the specialized use case.

In step S121, the pre-condition described in the specialized use case created in the above manner is displayed. The flow then advances to step S122. If it is determined in step S118 that the target use case is not obtained by specializing another use case, the flow advances to step S122 without performing the processing in steps S119 to S121.

In step S122, it is checked whether an alternative series is defined in the target use case. If NO in step S122, the flow advances to step S126 to display the basic series. If YES in step S122, the flow advances to step S123 to display the alternative series with a branch mark like the one shown in FIG. 21 being attached. In step S124, choices (selection menu) pop up, which include the events of the alternative series and the events of the basic series as a target to be replaced.

In step S125, it is checked whether the basic series or alternative series is selected from the displayed choices. If the basic series is selected, the flow advances to step S126 to display the events of the selected basic series. In step S128, it is checked whether there is any extended use case. If YES in step S128, the flow returns to step S111. If NO in step S128, the flow advances to step S129.

In step S129, it is checked whether there is a used case to be used. If NO in step S129, the flow advances to step S130 to check whether the use case is terminated. If NO in step S130, the flow returns to step S122 to execute the above operation again.

If it is determined in step S130 that the use case is terminated, the flow advances to step S131 to check whether the terminated use case is the use case that is activated first. If YES in step S131, the processing is terminated. If NO in step S131, the flow advances to step S132 to return to the execution of the original use case in the level immediately above. Thereafter, the flow returns to step S122 to execute the above operation again.

If it is determined in step S129 that there is a use case to be used, the flow returns to step S111 to read out that use case from the requisition sheet storage section 102. The processing in step S112 and the subsequent steps is performed for this new use case.

If the alternative series is selected in step S125, the flow advances to step S127 to display the events of the selected alternative series following the previous display. In step S128, it is checked whether there is an extended use case. If NO in step S128, it is further checked in step S129 whether there is a use case to be used. If YES in step S129, the flow returns to step S111 to read out that use case from the requisition sheet storage section 102. The processing in step S112 and the subsequent steps is performed for the new use case. If NO in step S129, the flow advances to step S130. Thereafter, the above processing is executed.

When the use case executing section 103 executes operation like the one shown in FIG. 26, the events of use cases are sequentially executed by interactive processing with the user. At this time, a log recording section 105 in FIG. 24 records each executed use case and event as a log in a scenario storage section 106 every time they are executed. As a result, a scenario representing the process of execution of use cases and events in the use cases is automatically created. That is, the user can create a detailed scenario representing the operation of a system by only selecting branch destinations as needed.

Referring back to FIG. 24, a total time computing section 114 computes the total time required to execute a series of processes according to a scenario stored in the scenario storage section 106 by using the scenario. In this embodiment, the time taken to execute business operation represented by each use case is described by the requisition sheet describing section 111. The total time computing section 114 therefore calculates the virtual total time required to execute business operation according to the scenario by totaling the times required to process the respective use cases included in the scenario.

By calculating the total time required to execute a created scenario in this manner, one index can be obtained, which is used to determine the adequacy, feasibility, or the like of a requisition for systematization. If, for example, it is found that much time is required to execute a scenario, for example, the scenario can be corrected or remade.

In this case, a process time is set for each use case. However, a process time may be set for each event in each use case.

An importance degree/use frequency setting section 115 sets an importance degree, use frequency, or the like with respect to a scenario stored in the scenario storage section 106. A scenario analyzing section 116 analyzes the importance degree, use frequency, or the like set for the scenario by the importance degree/use frequency setting section 115 so as to obtain the importance degree, use frequency, or the like of each use case included in the scenario.

The scenario analyzing section 116 sets an importance degree, use frequency, or the like for each use case according to predetermined logic. For example, the scenario analyzing section 116 sets the importance degree, use frequency, or the like set for a scenario by the importance degree/use frequency setting section 115 with respect to each use case included in the scenario without any change. If identical use cases are included in scenarios, and different importance degrees are set for the respective scenarios, the highest importance degree is set for the use cases. In addition, for example, a logic may be used, which states that if a given use case is used in scenarios by the number of times larger than a predetermined value, an importance degree higher than the importance degree set for the scenario including the use case may be set for the use case.

In creating a requisition sheet, an importance degree or use frequency is set for each use case for the sake of convenience in checking the contents of the created requisition sheet afterward. For example, a high importance degree is set for a use case which is important in terms of the flow of business operation or a use case for which there is a strong demand for systematization because it has been manually processed and cumbersome processing has been required.

In general, such an importance degree, use frequency, or the like is set for each use case by the requisition sheet describing section 111. However, as the umber of use cases increases, this operation becomes very complicated. In addition, it is not always easy for the operator, who describes a requisition sheet, to determine an importance degree, use frequency, or the like for each use case.

In this embodiment, although an importance degree, use frequency, or the like can be set for each use case, an importance degree, use frequency, or the like can be set for a created scenario by using the importance degree/use frequency setting section 115. If, therefore, scenarios covering all use cases can be implemented by a smaller number of scenarios than the total number of use cases, the setting operation can be simplified by setting importance degrees, use frequencies, or the like for the scenarios.

In addition, since the user can view importance degrees, use frequencies, or the like as a whole on the basis of scenarios representing the flows of use cases instead of viewing them in detail for the respective use cases, he/she can easily comprehend the importance degrees, use frequencies, or the like, thereby easily setting them.

Note that process times, importance degrees, and use frequencies set in this embodiment are merely examples. That is, the present invention can be applied to either a case wherein it is easier to define (or measure) a value for each use case, a value for a scenario can be calculated on the basis of the defined values, and the calculated value is more significant or a case wherein it is easier to define (or measure) a value for a scenario, and a value for each use case can be calculated on the basis of the defined value, and the value is more significant.

Other Embodiments of Present Invention

The description support apparatus for requisition sheet according to this embodiment described above is constituted by the CPU or MPU, RAM, ROM, and the like of a computer, and can be implemented when the program stored in the RAM or ROM runs. This apparatus can therefore be implemented by recording a program for operating the computer to execute the above functions in a recording medium such as a CD-ROM and making the computer load it. As the recording medium, for example, a floppy disk, a hard disk, an optical magnetic disk, a nonvolatile memory card, and the like, may be used as well as a CD-ROM.

The functions of the above embodiments may be implemented not only by making the computer execute the supplied program but also by executing the program in cooperation with an OS (operating system) running on the computer or another application software program and the like. Furthermore, the functions of the above embodiments may be implemented by making an extension board or unit of the computer execute all or part of the processing of the supplied program.

In addition, in order to use the present invention in a network environment, all or part of the program may be executed by another computer. For example, window input processing may be performed by a remote terminal computer, while various determination processes, log recording, and the like may be performed by another center computer or the like.

It is to be understood that the above embodiments are merely detailed examples in practicing the present invention, and the technical range of the present invention is not limited by them. In other words, various changes and modifications can be made within the spirit and scope of the invention.

What is claimed is:

1. A description support apparatus for requisition sheet, comprising:
   requisition sheet describing means for describing a requisition sheet model to specify a function of a system in consideration of the use of the system,
   wherein constituent elements of said requisition sheet model include a use ease indicating sequence of events performed by an operator, an actor indicating a specific person who actually performs each event, data indicating specific data to be used in each event, and condition indicating a state to be satisfied in each event, and said requisition sheet model is described in the form using at least the use case,
   relationship analyzing means for analyzing a use relationship, a generalization relationship and an extension relationship between predetermined constituent elements constituting said described requisition sheet model; and
   relationship output means for outputting an analysis result obtained by said relationship analyzing means.

2. A description support apparatus for requisition sheet according to claim 1, characterized in that
   said requisition sheet describing means includes views serving as information input windows for describing said requisition sheet in the form of a use case, and including a view for describing said use case on a text basis and a view for describing said use case on a diagram basis, and
   comprises information updating means for, when said requisition sheet is described by using one of said views, updating information to reflect the description contents in the remaining views.

3. A description support apparatus for requisition sheet according to claim 2, characterized in that said information updating means updates information in said remaining views on the basis of the analysis result by said relationship analyzing means.

4. A description support apparatus for requisition sheet according to claim 1, wherein:
   said relationship analyzing means comprises first analyzing means for analyzing a relationship between constituent elements included in a single unit requisition sheet, and further comprising a
   second analyzing means for further analyzing a relationship between constituent elements across unit requisition sheets by using an analysis result obtained for each unit requisition sheet by said first analyzing means.

5. A description support apparatus for requisition sheet according to claim 4, characterized in that
   said apparatus further comprises designating means for designating constituent elements as targets whose relationship is to be analyzed and said second analyzing means or both said first and second analyzing means analyze only a relationship between the designated constituent elements in accordance with a designation by said designating means.

6. A description support apparatus for requisition sheet according to claim 1, characterized in that said relationship output means displays a result obtained by analyzing a relationship between two constituent elements, in the form of a matrix.

7. A description support apparatus for requisition sheet according to claim 1, characterized in that said relationship output means displays a result obtained by analyzing a relationship between constituent elements, as a use ease diagram.

8. A description support apparatus for requisition sheet according to claim 1 wherein said requisition sheet describing means describes said requisition sheet according to a predetermined format so as to include constituent elements of the requisition model.

9. A description support method for requisition sheet, the method comprising:
    describing a requisition sheet in accordance with a predetermined format which is set in advance such that constituent elements of a requisition sheet model are included,
    wherein constituent elements of said requisition sheet model include a use case indicating a sequence of events performed by an operator, an actor indicating a specific person who actually performs each event, data indicating specific data to be used in each event, and condition indicating a state to be satisfied in each event and said requisition sheet model is described in the form using at least the use case;
    analyzing a use relationship, a generalization relationship, and an extension relationship between constituent elements of the requisition sheet model described according to said predetermined format; and
    outputting an analysis result.

10. A description support method for requisition sheet according to claim 9, characterized in that said requisition sheet describing step allows views to be displayed as information input windows for describing said requisition sheet in the form of use case, said views including a view for describing said use case on a text basis and a view for describing said use case on a diagram basis, and
    said method further comprises the information updating step of, when said requisition sheet is described by using one of said views, updating information to reflect the description contents in the remaining views.

11. A description support method for requisition sheet according to claim 10, characterized in that the information in said remaining views is updated in said information updating step on the basis of the analysis result by said relationship analyzing step.

12. A description support method for requisition sheet according to claim 9, characterized in that
    said relationship analyzing step comprises the first analyzing step of analyzing a relationship between constituent elements included in a single unit requisition sheet, and
    the second analyzing step of further analyzing a relationship between constituent elements across unit requisition sheets by using an analysis result obtained for each unit requisition sheet in said first analyzing step.

13. A description support method for requisition sheet according to claim 9, characterized in that
    said relationship analyzing step comprises the first analyzing step of analyzing relationship between constituent elements included in a single unit requisition sheet,
    the designating step of designating constituent elements, of constituent elements of said requisition sheet model, as targets whose relationship is to be analyzed; and
    the second analyzing step of further analyzing a relationship between the constituent elements, designated in said designating step, across unit requisition sheets by using an analysis result obtained for each unit requisition sheet in said first analyzing step.

14. A description support method for requisition sheet according to claim 9, characterized in that, in said relationship output step, a result obtained by analyzing a relationship between two constituent elements is displayed in the form of a matrix.

15. A description support method for requisition sheet according to claim 9, characterized in that, in said relationship output step, a result obtained by analyzing a relationship between constituent elements is displayed as a use ease diagram.

16. A computer-readable recording medium comprising a computer program recorded thereon for causing a computer to carry out the functions of:
    describing a requisition sheet model to specify a function of a system in consideration of the use of the system, wherein constituent elements of said requisition sheet model include n use case indicating a sentience of events performed by an operator, an actor indicating a specific: person who actually performs each event, data indicating specific data to be used in each event, and condition indicating a state to be satisfied in each event, and said requisition sheet model is described in the form using at least the use case; and having views serving as information input windows for describing requisition sheet in the form of use case having a predetermined format set in advance to include constituent elements of a requisition sheet model and including a view for describing the use case on a text basis and a view for describing the use case on a diagram basis, for describing the requisition sheet in accordance with one of the views;
    analyzing a use relationship, a generalization relationship, and an extension relationship between predetermined constituent elements constituting said described requisition sheet model; and
    when said requisition sheet is described by using one of said views, updating information to reflect description contents of said requisition sheet in the remaining views on the basis of an analysis result obtained by said analyzing.

17. A description support apparatus for requisition sheet, comprising:
    use case executing means for sequentially reading use cases included in a requisition sheet and displaying said requisition sheet on a screen, on the basis of said requisition sheet described in the form of use case according to a predetermined standard; and
    log recording means for recording a log by sequentially recording each of use cases read by the use case executing means.

18. A description support apparatus for requisition sheet according to claim 17, characterized in that
    said apparatus further comprises branch selecting means for making a user select a use case to be executed next at a branch appearing in the process of executing the preceding use case, and
    said use case executing means sequentially executes the use cases by interactive processing with the user.

19. A description support apparatus for requisition sheet according to claim 17, characterized in that said use case executing means sequentially executes the use cases included in said requisition sheet by automatically selecting a use case to be executed next at a branch appearing in the process of the preceding use case.

20. A description support apparatus for requisition sheet according to claim 19, characterized in that said use case executing means sequentially executes the use cases included in said requisition sheet by automatically and sequentially selecting all branch destinations that can be taken as use cases to be executed next at a branch appearing in the processing of executing the use case.

21. A description support apparatus for requisition sheet according to claim 17, characterized in that
said apparatus further comprises condition setting means for providing said use case executing means with a condition in which each use case included in said requisition sheet is executed, and
said use case executing means sequentially executes the use cases by automatically selecting a use ease to be executed next at a branch appearing in the process of the preceding use case within the range of a provided condition.

22. A description support apparatus for requisition sheet according to claim 17, characterized by further comprising structuralizing means for structuralizing said respective constituent elements of said requisition sheet, described in the form of use case, by using at least one of a use relationship in which a given constituent element uses another constituent element, a generalization relationship in which a new constituent element is created by partly changing an original constituent element, and an extension relationship in which when a specific condition is satisfied in a given constituent element, another constituent element is processed.

23. A description support apparatus for requisition sheet according to claim 22, characterized in that a relationship between an event in said use case and another use case is structuralized according to said use relationship and said extension relationship.

24. A description support apparatus for requisition sheet according to claim 23, characterized in that said use case executing means sequentially executes each use case by branching from an event in a given use case to another use case in accordance with the use, generalization and extension relationships structuralized by said structuralizing means.

25. A description support apparatus for requisition sheet according to claim 23, characterized by having a first mode of sequentially executing each use case by branching from a given use case to another use case in accordance with links established between use cases of a basic series and use cases of an alternative series, and a second mode of sequentially executing each use case by branching from an event in the given use case to another use case in accordance with the use, generalization, and extension relationships between use cases which are structuralized by said structuralizing means.

26. A description support apparatus for requisition sheet according to claim 17, characterized by further comprising:
requisition sheet describing means for describing the process time for each use case in describing the requisition sheet; and
total time computing means for computing the total process time taken for a series of processes indicated by a log recorded by said log recording means on the basis of the process time for each use case which is described by said requisition sheet describing means.

27. A description support apparatus for requisition sheet according to claim 17, characterized by further comprising:

importance degree/use frequency setting means for setting at least one of an importance degree and a use frequency with respect to the log recorded by said log recording means; and
log analyzing means for analyzing the log in which at least one of the importance degree and the use frequency is set, and obtaining at least one of the importance degree and the use frequency of each use case included in the log.

28. A description support method for requisition sheet, the method comprising:
sequentially trading use cases included in a requisition sheet described in the form of use case according to a predetermined standard;
displaying said requisition sheet on a screen; and
sequentially recording each use case that was read.

29. A description support method for requisition sheet according to claim 28, characterized in that the use cases are sequentially executed by interactive processing with a user by making the user select a use case to be executed next at a branch appearing in the process of the preceding use case.

30. A description support method for requisition sheet according to claim 28, characterized in that the use cases are sequentially executed by automatically selecting a use case to be executed next at a branch appearing in the process of the preceding use case.

31. A description support method for requisition sheet according to claim 28, characterized in that the respective constituent elements of the requisition sheet, described in the form of use case, are structuralized by using at least one of a use relationship in which a given constituent element uses another constituent element, a generalization relationship in which a new constituent element is created by partly changing an original constituent element, and an extension relationship in which when a specific condition is satisfied in a given constituent element, another constituent element is processed.

32. A description support method for requisition sheet according to claim 31, characterized in that a relationship between an event in said use case and another use case according to said use relationship and said extension relationship is structuralized, and the use cases are sequentially executed by branching from an event in a given use case to another use case in accordance with the structuralized use, generalization and extension relationship between said use cases.

33. A description support method for requisition sheet according to claim 28, characterized in that:
the process time for each use case is described in describing said requisition sheet; and
the total process time taken for a series of processes indicated by the log, in which the process of executing each of the use cases is recorded, is computed on the basis of the described process time for each use case.

34. A description support method for requisition sheet according to claim 28, characterized in that at least one of an importance degree and a use frequency with respect to the log in which the process of executing each of the use cases is recorded, is set, the log in which at least one of the importance degree and the use frequency is set, is analyzed, and at least one of the importance degree and use frequency of each use case included in the log is obtained.

35. A computer-readable recording medium comprising a computer program recorded thereon for causing a computer to carry out the functions of:

sequentially reading use cases included in a requisition sheet on the basis of said requisition sheet described in the form of use case according to a predetermined standard;

displaying said requisition sheet on a screen; and sequentially recording each use case that was read.

36. A computer-readable recording medium according to claim 35, characterized by a program recorded thereon for causing said computer further to function as:

structuralizing means for structuralizing the respective constituent elements of the requisition sheet model by using at least one of a use relationship in which a given constituent element uses another constituent element, a generalization relationship in which a new constituent element is created by partly changing an original constituent element, and an extension relationship in which when a specific condition is satisfied in a given constituent element, another constituent element is processed.

37. A computer-readable recording medium according to claim 35, characterized by a program recorded thereon for causing said computer further to function as:

requisition sheet describing means for describing the process time for each use case in describing said requisition sheet; and total time computing means for computing the total process time taken for a series of processes indicated by a log recorded by said log recording means on the basis of the process time for each use case which is described by said requisition sheet describing means.

38. A computer-readable recording medium according to claim 35, characterized by program recorded thereon for causing said computer further to function as:

importance degree/use frequency setting means for setting at least one of an importance degree and a use frequency with respect to the log recorded by said log recording means; and log analyzing means for analyzing the log in which at least one of the importance degree and the use frequency is set, and obtaining at least one of the importance degree and use frequency of each use case included in the log.

39. A computer-readable recording medium comprising a computer program recorded thereon for causing a computer to carry out the functions of:

describing a requisition sheet model to specify a function of a system in consideration of the use of the system;

wherein constituent elements of said requisition sheet model include a use ease indicating a sequence of events performed by an operator, an actor indicating a specific person who actually performs each event, data indicating specific data to be used in each event, and condition indicating a state to be satisfied in each event, and said requisition sheet model is described in the form using at least the use case;

analyzing a use relationship, a generalization relationship, and an extension relationship between constituent elements constituting the requisition sheet model; and outputting the analysis result obtained by said analyzing.

40. A description support apparatus for a requisition sheet, comprising:

requisition sheet describing means for describing a requisition sheet in accordance with a predetermined standard which has been set such that a use case of a basic series representing a basic flow and a use case of an alternative series representing an exceptional flow can be described while being linked to each other;

use case executing means for sequentially reading use cases included in said requisition, sheet on the basis of said requisition sheet described in a form of said use case according to said predetermined standard and for displaying said requisition sheet on a screen; and log recording means for recording a log by sequentially recording the process of each of said use cases read by said use case executing means.

\* \* \* \* \*